US011282082B2

(12) United States Patent
Nelsen et al.

(10) Patent No.: US 11,282,082 B2
(45) Date of Patent: Mar. 22, 2022

(54) AUTHENTICATION SYSTEM WITH MESSAGE CONVERSION

(71) Applicant: Visa International Service Association, San Francisco, CA (US)

(72) Inventors: Mark Allen Nelsen, Oakland, CA (US); Craig O'Connell, San Mateo, CA (US); Karl Newland, Foster City, CA (US); Douglas Fisher, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 1017 days.

(21) Appl. No.: 14/814,073

(22) Filed: Jul. 30, 2015

(65) Prior Publication Data

US 2016/0034900 A1 Feb. 4, 2016

Related U.S. Application Data

(60) Provisional application No. 62/031,084, filed on Jul. 30, 2014.

(51) Int. Cl.
*G06Q 20/40* (2012.01)
*G06F 21/31* (2013.01)
*G06Q 20/32* (2012.01)

(52) U.S. Cl.
CPC ......... *G06Q 20/4016* (2013.01); *G06F 21/31* (2013.01); *G06Q 20/3224* (2013.01); *G06Q 20/40* (2013.01)

(58) Field of Classification Search
CPC ............... G06Q 20/3224; G06Q 20/40; G06Q 20/4016; G06F 21/31

(Continued)

(56) References Cited

U.S. PATENT DOCUMENTS 8,688,543 B2 4/2014 Dominguez
2003/0200184 A1* 10/2003 Dominguez ............... G07F 7/10
705/78

(Continued)

OTHER PUBLICATIONS

Ron White, How Computers Work, Oct. 15, 2003, Paul Boger, Illustrated by Timothy Edward Downs, 7th Edition (Year: 2003).*

(Continued)

*Primary Examiner* — John W Hayes
*Assistant Examiner* — Wodajo Getachew
(74) *Attorney, Agent, or Firm* — Kilpatrick Townsend & Stockton LLP

(57) ABSTRACT

A server computing device receives authentication request messages formatted according to a first message format from a party via a computing device of a user involved in a transaction, translates the messages into modified authentication request messages formatted according to a second message format, and transmits the modified authentication request messages to an authorization computer. The server computing device may augment the modified authentication request messages by including data gathered from the received authentication request messages describing the user, user's computing device, and/or network path between the server computing device and user's computing device, as well as risk scores generated based upon the received authentication request message. Additionally, the server computing device receives messages formatted according to the second message format from the authorization computer and translates them into messages formatted according to the first message format to be sent to the user's computing device.

8 Claims, 8 Drawing Sheets

(58) Field of Classification Search
USPC .................................................. 705/72, 50
See application file for complete search history.

(56) References Cited

U.S. PATENT DOCUMENTS

| | | | |
|---|---|---|---|
| 2004/0254848 A1 | 12/2004 | Golan et al. | |
| 2006/0271496 A1 | 11/2006 | Balasubramanian et al. | |
| 2007/0143227 A1 | 6/2007 | Kranzley et al. | |
| 2008/0154770 A1 | 6/2008 | Rutherford et al. | |
| 2010/0114776 A1* | 5/2010 | Weller | H04L 9/3213 705/44 |
| 2010/0211938 A1* | 8/2010 | Singh | G06Q 20/40 717/141 |
| 2011/0112954 A1 | 5/2011 | Bruesewitz et al. | |
| 2011/0258118 A1 | 10/2011 | Ciruea | |
| 2012/0018506 A1 | 1/2012 | Hammad et al. | |
| 2012/0144461 A1* | 6/2012 | Rathbun | H04L 9/3213 726/5 |
| 2013/0254110 A1 | 9/2013 | Royyuru et al. | |
| 2013/0254112 A1 | 9/2013 | Hammad | |
| 2014/0156535 A1* | 6/2014 | Jabbour | G06Q 20/4012 705/72 |
| 2014/0164253 A1 | 6/2014 | Dominguez | |
| 2014/0279477 A1 | 9/2014 | Sheets | |
| 2015/0120559 A1 | 4/2015 | Fisher | |
| 2015/0120560 A1 | 4/2015 | Fisher | |
| 2015/0220890 A1* | 8/2015 | Seshadri | G06Q 20/409 705/44 |

OTHER PUBLICATIONS

Extended European Search Report, dated Nov. 29, 2017, in EP Application No. 15828186.5, 8 pages.
International Search Report and Written Opinion dated Oct. 27, 2015 in PCT/US2015/042948, 13 pages.

* cited by examiner

AUTHENTICATION SYSTEM WITH MESSAGE CONVERSION

CROSS-REFERENCES TO RELATED APPLICATIONS

This application is a non-provisional of and claims the benefit of priority to U.S. Provisional Application No. 62/031,084, filed Jul. 30, 2014, which is hereby incorporated by reference in its entirety for all purposes.

BACKGROUND

During a transaction, it is desirable to verify a user conducting the transaction in order to avoid issues, such as fraud. For example, during a payment transaction using a payment device (e.g., a credit, debit, or stored value card), it is desirable to verify a cardholder's ownership of an account to avoid a variety of problems, such as unauthorized use. Payer authentication is the process of verifying a cardholder's ownership of an account. The most common method to authenticate a cardholder's ownership of an account occurs routinely at a point of sale during what is called a "card present" transaction. A card present transaction involves a merchant's representative taking the cardholder's card, swiping it though a payment card terminal to verify account status and credit line availability, and then checking to see that the signature on the back of the card matches the purchaser's signature. However, it is more difficult to perform payer authentication for "Card not present" transactions (such as those occurring online, through the mail, or over the telephone). One previous system for performing online payer authentication has been developed by Visa International Service Association and widely implemented, and is known as the 3-D Secure System (or "Verified by Visa" system).

Given the continued expected high growth of electronic commerce, it is important to continually improve and further develop methods and systems to authenticate online payers. This will benefit all payment system participants including cardholders, merchants, and financial institutions. Authenticating payers of online purchase transactions will reduce the levels of fraud, disputes, retrievals, and chargebacks, which subsequently will reduce the costs associated with each of these events. Authenticating the payer also addresses consumer security concerns and therefore will lead to increased online sales.

Embodiments of the invention address these and other problems, individually and collectively.

SUMMARY

Embodiments of the invention relate to systems, methods, devices, and computer-readable media storing instructions relating to techniques for enhanced payer authentication. Embodiments of the invention translate payer authentication messages sent by consumer computing devices according to one message format into messages of another message format that can more easily be understood and processed by financial institutions such as issuers. Embodiments of the invention can translate messages received from the financial institutions (of a particular message format) back into messages of a different message format that are commonly used by consumer computing devices over the Internet when performing transactions. Embodiments of the invention can also capture customer or device information and present the information to issuers within translated messages, and some embodiments can perform additional risk analysis based upon this information and can provide outputs of the risk analyses to the issuers within the translated messages for their use during customer authentication and/or payment authorization. Embodiments allow for issuers to consolidate customer authentication and payment authorization logic/systems and easily utilize data from the customer authentication phase in the payment authorization phase.

One embodiment of the invention is directed to a method comprising receiving, at a server computing device from a computing device of a user, an authentication request message for a transaction that is formatted according to a first message format and originated from a resource provider computing device, wherein the transaction involves an authorization computer. The method further comprises generating, by the server computing device based upon the authentication request message, a modified authentication request message formatted according to a second message format and transmitting, by the server computing device to the authorization computer, the modified authentication request message, wherein the authorization computer initiates an authentication process with the user using the computing device. In some embodiments, the first message format comprises a Hypertext Transfer Protocol (HTTP) messaging standard and the second message format comprises an International Organization for Standardization (ISO) 8583 messaging standard. In some cases, the authentication request message includes a transaction and includes sufficient information for the authorization computer to make both an authentication decision and an authorization decision for the transaction.

In some embodiments, the method further comprises, receiving, at the server computing device from the authorization computer, an authentication response message formatted according to the second message format, wherein the authentication response message includes an authorization result. The method can further comprise transmitting, by the server computing device to the resource provider computing device, the authentication response message.

In some embodiments, the authentication request message may be a payer authentication request message, the authentication response message may be payer authentication response message, the resource provider computing device may be a merchant computing device, the transaction may be a financial transaction, and the authorization computer may be an issuer computer.

In some embodiments, the method may further comprise generating, by the server computing device based upon the received authentication request message, a risk assessment value for the transaction. In some implementations, modified authentication request message comprises the risk assessment value and one or more of a device identifier of the computing device of the user, a geolocation value that identifies a geographic location of the computing device of the user, a feature identifier that identifies technological capabilities of the computing device of the user; and a network address of the computing device of the user.

In some embodiments, the method may further comprise receiving, at the server computing device from the authorization computer, an authentication response message formatted according to the second message format, generating, by the server computing device based upon the authentication response message, a modified authentication response message formatted according to the first message format, and transmitting, by the server computing device to the computing device of the user, the modified authentication response message.

Another embodiment of the invention is directed to a computing device comprising a set of one or more processors, a set of one or more physical network interfaces coupled with the set of processors and adapted to transmit and receive messages with a set of one or more other computing devices, and a computer readable storage medium coupled with the set of processors and storing instructions. The instructions may be executed by the set of processors, which causes the computing device to perform a method comprising receiving, from a computing device of a user, an authentication request message for a transaction that is formatted according to a first message format and originated from a resource provider computing device, wherein the transaction involves an authorization computer, generating, based upon the authentication request message, a modified authentication request message formatted according to a second message format, and transmitting, to the authorization computer, the modified authentication request message, wherein the authorization computer initiates an authentication process with the user using the computing device. In some embodiments, the first message format comprises a Hypertext Transfer Protocol (HTTP) messaging standard and the second message format comprises an International Organization for Standardization (ISO) 8583 messaging standard.

Another embodiment of the invention is directed to a method comprising receiving, by a server computer, a modified authentication request message formatted according to a second message format from a server computing device, wherein the server computing device generates the modified authentication request message based upon an authentication request message formatted according to a first message format from a computing device of a user. The method further comprises initiating, by the server computer, an authentication process with the user using the computing device. In some embodiments, the first message format comprises a Hypertext Transfer Protocol (HTTP) messaging standard and the second message format comprises an International Organization for Standardization (ISO) 8583 messaging standard.

In some embodiments, the method further comprises generating, by the server computer, an authentication response message formatted according to the second message format and sending, by the server computer, the authentication response message to the server computing device, wherein the server computing device generates a modified authentication response message formatted according to the first message format.

In some implementations, the modified authentication request message comprises a risk assessment and one or more of a device identifier of the computing device of the user, a geolocation value that identifies a geographic location of the computing device of the user, a feature identifier that identifies technological capabilities of the computing device of the user, and a network address of the computing device of the user.

DETAILED DESCRIPTION

Figure 1:
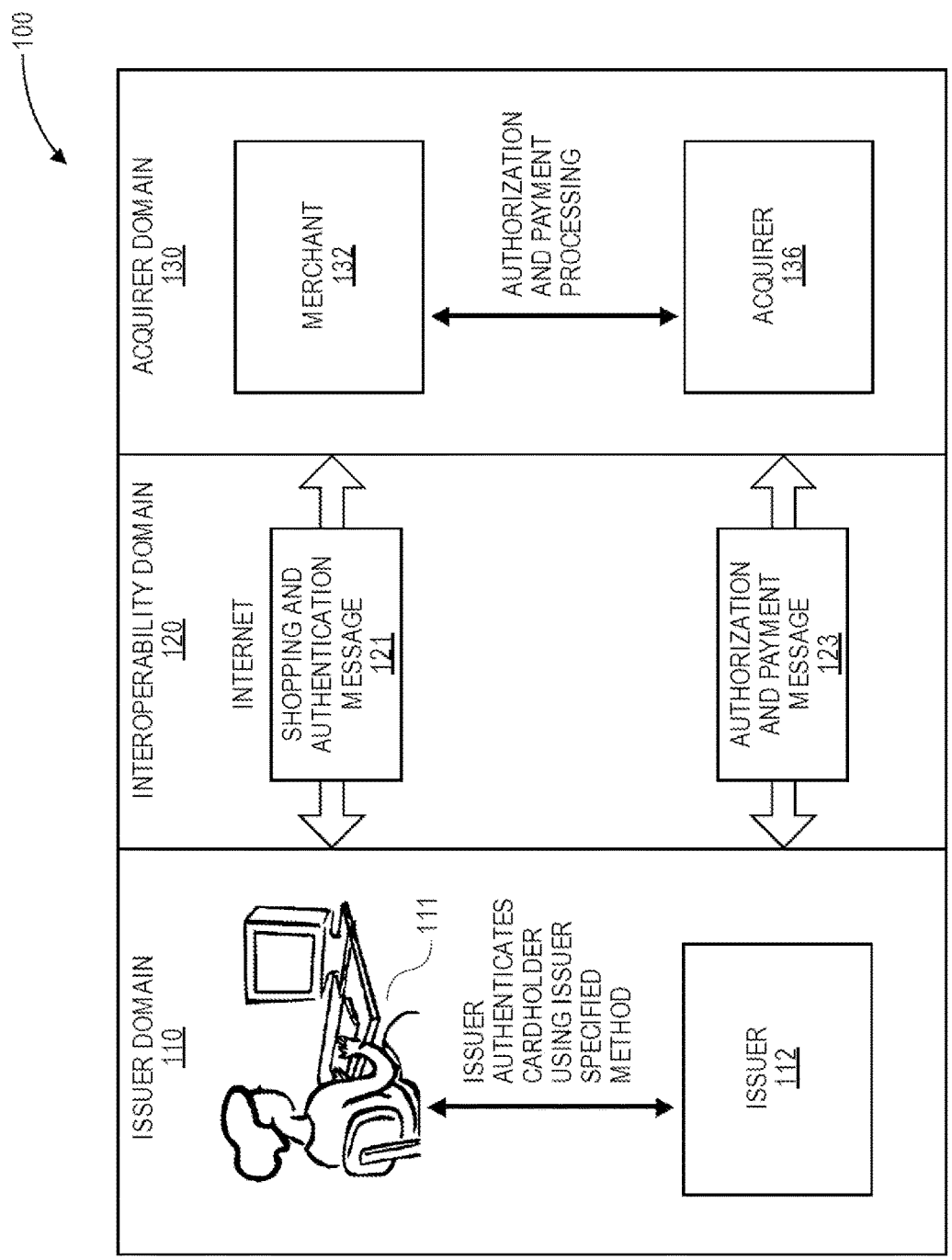
FIG. 1 illustrates a block diagram of an exemplary payment system for performing payer authentication.

Embodiments of the invention may provide exemplary systems, devices, and methods for conducting a transaction and related activities. Although reference may be made to such transactions in the examples provided below, embodiments are not so limited. That is, the systems, methods, and apparatuses described herein may be utilized for any suitable purpose.

Prior to discussing embodiments of the invention, description of some terms may be helpful in understanding embodiments of the invention.

An "authentication request message" may be an electronic message that is sent to one or more computing devices to request authentication for a transaction. In some embodiments, the authentication request message may be an electronic message that is sent to a payment processing network and/or an issuer of a payment account to request authentication for a payment transaction. In some implementations, the authentication request message may include cardholder, merchant, and transaction-specific information. The authentication request message according to some embodiments may comply with HTTP message format, which may be defined according to the HTTP messaging specification, and may be an HTTP "GET" or "POST" message.

A "modified authentication request message" may be an electronic message that is sent to one or more computing devices to request authentication for a transaction and may be altered based on an initial or previous authentication request message. In some implementations, the modified authentication request message may include cardholder, merchant, and transaction-specific information. In some embodiments, the modified authentication request message may be an electronic message that is sent to a payment processing network and/or an issuer of a payment account and may be translated to be formatted according to a second message format (e.g., ISO standard) from an authentication request message formatted according to a first message format (e.g., HTTP standard). In some implementations, the modified authentication request message may include additional information (e.g., device data, traffic information, risk information, risk assessment value, etc.) that was not part of the authentication request message.

An "authentication response message" may be an electronic message reply to an authentication request. In some embodiments, the authentication response message may be generated by an issuing financial institution (i.e. issuer) or a payment processing network. In some implementations, the authentication response message may include cardholder, merchant, and transaction-specific information. An authentication response message according to some embodiments may comply with ISO 8583, which is a message format for systems that exchange electronic transaction information associated with a payment made by a consumer using a payment device or a payment account. The authentication response message may include an authentication result (which may also be known as an authentication determination), which may be a value that an account issuing bank returns in response to an authentication request in an electronic message (either directly or through the payment processing network) to a merchant's access device (e.g., point of sale terminal) that indicates authentication of a user conducting a transaction.

A "modified authentication response message" may be an electronic message reply to an authentication request and may be altered based on an authentication response message. In some implementations, the modified authentication response message may include cardholder, merchant, and transaction-specific information. In some embodiments, the modified authentication response message may be an electronic message that is sent to a payment processing network and/or an issuer of a payment account to request for a transaction and may be translated to be formatted according to a first message format (e.g., HTTP standard) based on an authentication response message formatted according to a second message format (e.g., ISO standard). In some implementations, the modified authentication response message may include additional information that was not part of the authentication response message.

An "authorization request message" may be an electronic message that is sent to a payment processing network and/or an issuer of a payment account to request authorization for a payment transaction. An authorization request message according to some embodiments may comply with ISO 8583, which is a message format for systems that exchange electronic transaction information associated with a payment made by a consumer using a payment device or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.), as well as any other information that may be utilized in determining whether to identify and/or authorize a payment transaction.

An "authorization response message" may be an electronic message reply to an authorization request message generated by an issuing financial institution (i.e. issuer) or a payment processing network. An authorization response message according to some embodiments may comply with ISO 8583, which is a message format for systems that exchange electronic transaction information associated with a payment made by a consumer using a payment device or a payment account. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant.

A "server computer" may typically be a powerful computer or cluster of computers. For example, the server computer can be a large mainframe, a minicomputer cluster, or a group of servers functioning as a unit. In one example, a server computer may be a database server coupled to a Web server. The server computer may be associated with an entity such as a merchant, payment processing network, a wallet provider, a merchant, an authentication cloud, an acquirer, or an issuer.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. A mobile device, a cardholder device, a user device, a consumer device, and a server computing device may be exemplary types of computing devices.

A "server computing device" may be any suitable electronic device operated by a server computer. In some embodiments, the server computing device may receive messages from the server computer and send the messages to one or more other entities. Additionally, the server computing device may forward messages received from one or more other entities to the server computer. The server computing device may be a type of computing device. In some embodiments, the server computing device may be operated by a payment processor or issuer computer.

An "authorization computer" may include any suitable system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource. In some cases, the authorization computer may be a content provider server computer associated with a content providing entity, which manages one or more resources that may be accessed by the user.

"A resource providing entity" may be any suitable entity that may make resources available to a user. Examples of resource providing entities include merchants, vendors, suppliers, owners, traders, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., mobile applications, e-commerce websites, online companies, etc.). In some embodiments, resource providing entities may make available physical items (e.g., goods, products, etc.) to the user. In other embodiments, resource providing entities may make available digital resources (e.g., electronic documents, electronic files, etc.) to the user. In other embodiments, resource providing entities may manage access to certain resources (e.g., password, code, etc.) by the user.

A "resource provider computing device" may include any suitable system associated with a resource providing entity. In some embodiments, the resource provider computing device may handle functionality of a mobile application and/or a website associated with the resource providing entity from which a user may conduct an online transaction. The resource provider computing device may also be known as the resource provider server computer.

A "risk assessment value" may include a value that indicates a risk analysis result. The risk assessment value may be represented by one or more of a number (e.g., numerical score), a letter, alphanumeric value, a level, a threshold, a range, a set of attribute-value pairs, or other suitable values. In some embodiments, the risk assessment value may be generated by a server computing device, which may be associated with a payment processor or issuer computer. In some implementations, the risk assessment value may be determined based on information included in one or more messages (e.g., authentication message, etc.) sent to the server computing device.

A "device identifier" may be any suitable indicator including information that may be used to identify a computing device. The computing device may be associated with multiple device identifiers. For example, exemplary device identifiers may include a manufacturer identifier, account identifier, IP address, IMEI number, SIM card number, and other suitable identifiers. In some embodiments, one or more device identifiers may be included in a HTTP header of a HTTP message.

A "geolocation value" may be any suitable value that indicates the location of a computing device. In some implementations, the geolocation value may indicate a set of coordinates or a region and may be any combination of suitable characters (e.g., numerical, alphanumeric, etc.). In some embodiments, the geolocation value may be determined from an IP address of the computing device. For example, a database including information associating certain IP addresses to locations may be utilized to determine a geolocation value. The geolocation value may also be determined using signal strength, GPS module, and other suitable location determination technologies.

A "feature identifier" may be any suitable indicator including information about one or more characteristics of a computing device. The feature identifier may be of any length and may include numbers or alphanumeric characters that may be mapped to certain characteristics. In some embodiments, the one or more characteristics may include technological capabilities and configurations of the computing device. For example, the feature identifier may indicate whether cookies are enabled, whether a Flash multimedia player is installed and enabled, and whether JavaScript is enabled on the computing device.

A "message format" may be any data format that makes up a message. In some cases, a message formatted according to the message format may be formatted according to a certain messaging standard. In some embodiments, the message format may enable unique or system-specific fields and data elements in the message. In some embodiments, message formats may be associated with different standards (e.g., ISO standard, HTTP standard, etc.).

A "Hypertext Transfer Protocol (HTTP) messaging standard" may be a protocol defining how messages are formatted and transmitted over the World Wide Web. HTTP messages may include "GET" or "POST" messages, where "GET" messages may request data from a specified resource and "POST" messages may submit data to a specific resource for processing. In some embodiments, a HTTP message may comprise a request line including method, URL, and version fields, header lines, and an entity body. HTTP messages based on the standard may include messages that contain HTML, JavaScript, JSON, AJAX, XML, etc. In some cases, messages sent to and from a computing device of a user may be formatted according to a HTTP message format associated with the HTTP messaging standard.

An "International Organization for Standardization (ISO) 8583 messaging standard" may define how messages are formatted and transmitted by systems exchanging transaction requests and responses. The ISO 8583 messaging standard is a standard for systems that exchange electronic transaction information associated with a payment made by a consumer using a payment device or a payment account. The ISO 8583 messaging standard may define a message format including a message type identifier (MTI), bitmaps, and data elements. The MTI may be 4 digits that describe the message type including the relevant ISO 8583 version, message class, message function, and message origin. Within ISO 8583 standards, a bitmap may indicate which data elements or data element subfields (e.g., amongst fields 1 through 128) may be present elsewhere in an ISO 8583 message. The data elements may be the fields carrying the actual transaction information related to a transaction for which the message is involved. The standard may define permitted content, attributes, and field length of certain data fields.

Figure 2:
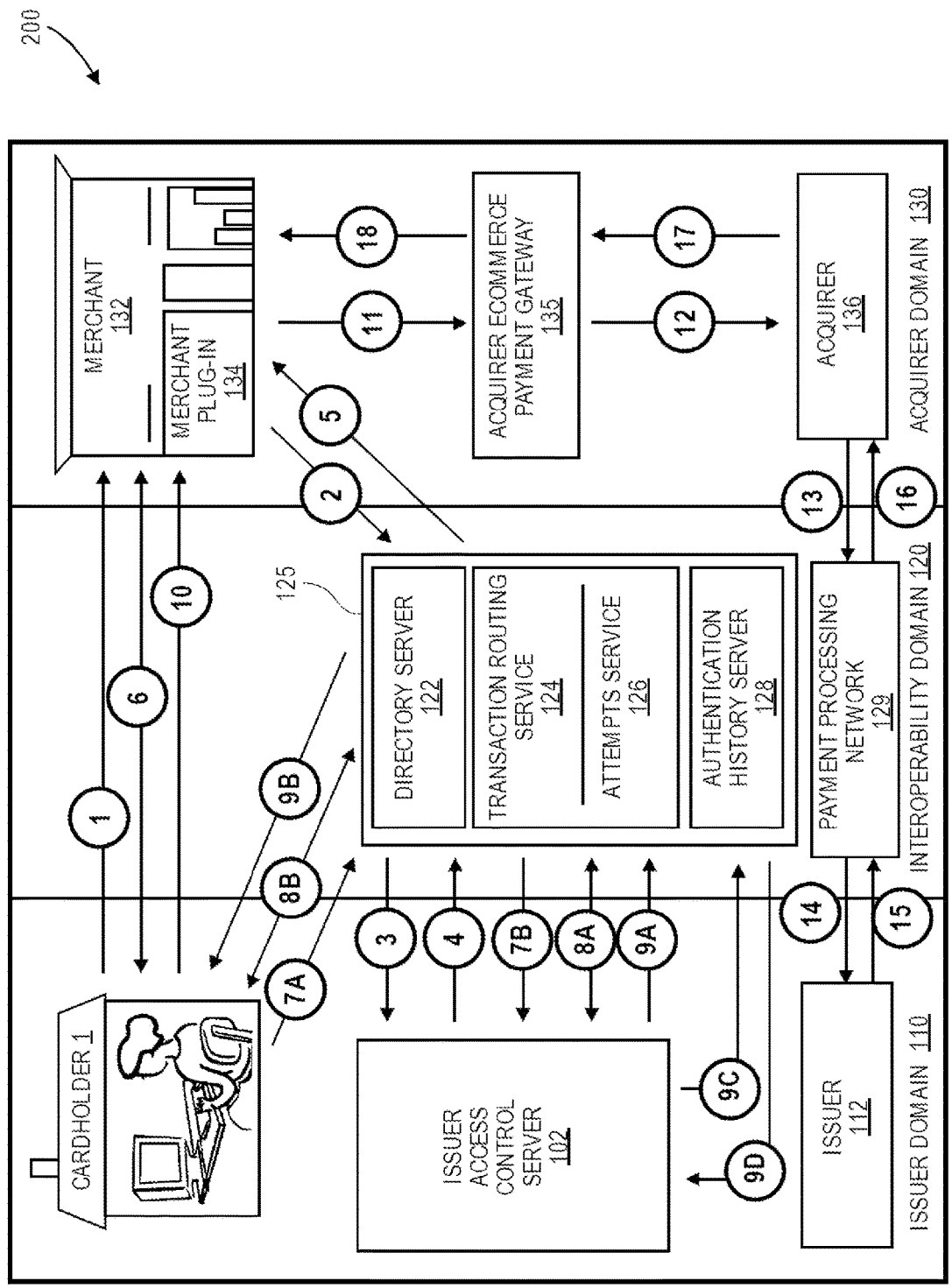
FIG. 2 illustrates a block diagram of an exemplary payment system for performing cardholder authentication.

Before discussing embodiments of the invention, some background regarding payer authentication is presented with regard to FIG. 1 and FIG. 2.

I. Exemplary Payer Authentication System

When a user wishes to make an online purchase with a merchant over the Internet, the user types in (or otherwise provides) a credit or debit card account number, cardholder name, expiration date, and/or the printed card verification value into respective fields on the merchant's checkout page. In this case, the card's magnetic fingerprint or the card's variable datum is not used in the transaction, and they are not available to the payment processing network or the issuing bank to aid in verifying that the card was actually present during the transaction. Accordingly, there is a greater risk of fraud with such online purchases. For example, a store clerk could copy the account information and printed verification value during a transaction at a point-of-sales location, and then later use the copied information to make an online purchase. As another example, a hacker can install spyware on the user's computer (or within a network) to intercept the account information and verification value, and use this information to make fraudulent purchases at other online merchants. Thus, to reduce the occurrence of these types of fraud, payer authentication systems have been developed.

FIG. 1 illustrates a block diagram 100 of an exemplary conventional payment system for performing payer authentication. To provide a more secure on-line transaction process, a 3-D Secure System ("Verified by Visa" system) has been previously developed and deployed. This system defines a three domain (3-D) model within which the entities involved in the 3-D Secure System work together to authenticate and authorize an online payment transaction.

Referring to FIG. 1, the 3-D model divides payment systems into three "domains" as follows: (1) an Issuer Domain 110—including systems and functions of issuer 112 and its customers (e.g., cardholders including user 111); (2) an Acquirer Domain 130—including systems and functions of acquirer 136 and its customers (e.g., merchants including merchant 132); and (3) an Interoperability Domain 120—including systems, functions, and messages (e.g., shopping and authentication messages 121, authorization and payment messages 123, etc.) that allow Issuer Domain systems and Acquirer Domain systems to interoperate worldwide. In some embodiments, shopping and authentication messages 121 may be sent over any suitable communications network and authorization and payment messages 123 may be sent by a payment processing network. Third parties may operate many of the systems in the Issuer and Acquirer Domains.

User 111 may be a cardholder that conducts a transaction with a merchant, such as merchant 132. Issuer 112 may be a business entity (e.g., a bank or other financial institution) that maintains financial accounts for a user and often issues a payment device such as a credit or debit card to a user, such as user 111. Merchant 132 may be an entity that engages in transactions and can sell goods and/or services to the user and may be operated by a merchant commerce server. Acquirer 136 may be a business entity (e.g., commercial bank or financial institution) that has a business relationship with a particular merchant or similar entity. Some entities may perform both issuer and acquirer functions. Issuer 112, merchant 132, and acquirer 136 may each be operated by one or more server computing devices.

This "three domain" model enables issuers, such as issuer 112, to authenticate their cardholders, such as user 111, during online purchases, and provides acquirers, such as acquirer 136, and merchants, such as merchant 132, a flexible framework that can embrace a variety of technical approaches. Interoperability between issuer 112 and acquirer 136 can be achieved through the use of a common protocol and interoperability services.

FIG. 2 illustrates a block diagram 200 of an exemplary payment system for performing cardholder authentication. As described in FIG. 1, the exemplary payment system may comprise an issuer domain 110, interoperability domain 120, and an acquirer domain 130. The interoperability domain 120 may allow Issuer Domain systems and Acquirer Domain systems to interoperate worldwide.

The issuer domain 110 may comprise a cardholder 1 using a computing device, an issuer Access Control Server (ACS) 102 (also known as Access Control Server 102), and issuer 112. In some embodiments, the ACS 102 may be part of issuer 112. Issuer 112 may be operated by a server computing device and may include a card processing module. The card processing module may comprise code to enable communication between the issuer domain 110 and interoperability domain 120 for transaction processing.

The Access Control Server 102 may be a server computing device storing and/or accessing registered cardholder account and access information. The ACS 102 is typically operated by an issuer or its processor, although some functionality may be "outsourced" to outside contractors. The ACS 102 validates cardholder participation in the payer authentication program, performs cardholder verification at time of purchase, and provides digitally signed responses to merchants.

The interoperability domain 120 may include a directory server 122, a transaction routing service 124, an attempts service 126, an authentication history server 128, and a payment processing network 129. In some embodiments, the directory server 122, the transaction routing service 124, the attempts service 126, and the authentication history server 128 may be operated by a server computing device 125, which may be operated by payment processing network 129. Payment processing network 129 may include data processing subsystems, networks, and operations used to support and deliver authorization services, exception file services, and clearing and settlement services, and may be in operative communication with entities in the issuer domain 110 and acquirer domain 130.

The Directory Server 122, in some embodiments, comprises one or more server computing devices, operated by a payment processor, which may route authentication requests from merchants to issuers' Access Control Servers (e.g., ACS 102) in order to return the results of authentication. The Directory Server 122 may include a number of routing tables for routing messages between parties.

The transaction routing service 124, in some embodiments, comprises a software module to enable processing authentication requests and responses. The transaction routing service 124 may, in conjunction with a data processor of server computing device 125 or other server computing device, receive authentication requests and responses and process the requests and responses to ensure a timely response to merchants, such as merchant 132.

The attempts service 126, in some embodiments, comprises a software module to enable providing attempted authentication responses to merchants. In some cases, the attempts service 126 may provide, in conjunction with a data processor of server computing device 125 or other server computing device, attempted authentication responses when a cardholder or issuer may not be enrolled in an authentication program or ACS 102 may not be able to provide an authentication response. Additionally, the attempts service 126 may provide, in conjunction with a data processor of server computing device 125 or other server computing device, stand-in processing when the ACS 102 does not respond to an authentication request, as well as proof that a merchant attempted to authenticate a transaction during a transaction dispute.

The authentication history server 128, in some embodiments, comprises one or more server computing devices, operated by a payment processor, which may store data about authentication transactions. The authentication history server 128 may be used to verify authenticated transactions and to provide information during a dispute resolution process.

The acquirer domain 130 may comprise a merchant 132, a merchant plug-in (or "MPI") 134, an acquirer e-commerce payment gateway 135, and acquirer 136. Acquirer 136 may be operated by a server computing device and may include a card processing module. The card processing module may comprise code to enable communication between the acquirer domain 130 and interoperability domain 120 for transaction processing.

The MPI 134, in some embodiments, comprises a software module integrated into merchant 132 websites, which can be used to provide the interface between the cardholder authentication program and the merchant's payment processing software. The MPI 134 may verify the issuer's digital signature used to sign authentication responses returned to the merchant, or this verification may be performed by a separate server, the acquirer 136, or a third party. The MPI 134 may comprise a software development kit (SDK), library files or functions, or other software modules.

The acquirer e-Commerce payment gateway 135, in some embodiments, may provide certain online services. Acquirer e-Commerce payment gateway 135 may be in operative communication with payment processing network 129. In some embodiments, a computing device operated by cardholder 1 may interact with payment processing network 129 via the acquirer e-Commerce payment gateway 135.

After an account of cardholder 1 has been enrolled in the cardholder authentication system, cardholder 1 may be enabled for use of cardholder authentication at any participating merchant. The steps (and messaging) for the financial transaction with cardholder authentication are now illustrated in FIG. 2 using numbered steps and are described herein.

At step 1, cardholder 1 finalizes a purchase. For example, cardholder 1 browses at a participating merchant's website, adds items to the shopping cart, and provides information utilized for checkout (e.g., by keyboard entering data or by using an electronic wallet, a merchant one click service, or some other form-fill method). Cardholder 1 may then confirm a purchase (e.g., by clicking or selecting a button labeled "Buy"), which triggers a payment form (e.g., sends a HTTP POST message) to be submitted to the merchant 132. Thus, the merchant 132 may now have data to perform the financial transaction, including a Primary Account Number (PAN) of the card presented for the purchase.

At step 2, the merchant plug-in 134 initiates 3D-Secure Processing. When cardholder 1 attempts to finalize a purchase or transaction (e.g., clicks "Buy" button), the Merchant Server Plug-in (MPI) 134 may be activated. The MPI 134 may send a request with the cardholder's provided PAN and other information to the Directory Server 122 to determine whether the card is in a participating range—i.e., whether the particular card is enabled for use with the cardholder authentication system.

At step 3, directory server 122 processes the request from MPI 134. The Directory Server 122, in some embodiments, authenticates the merchant (e.g., using digital certificates). If merchant authentication is successful, the Directory Server 122 may forward the merchant query to the appropriate Access Control Server (ACS) 102 to determine whether authentication (or proof of authentication attempt) is available for the card PAN. If merchant authentication fails, the Directory Server 122 may return an Error and the cardholder authentication transaction is terminated. If no appropriate ACS is available or the cardholder is not participating in the cardholder authentication system, the Directory Server 122 may route the request to the Attempts Service (within the interoperability domain 120), which will process the authentication on behalf of the issuer.

At step 4, ACS 102 responds to Directory Server 122. The issuer ACS 102 (or Attempts Service 126 if issuer ACS 102 is not available) may determine whether cardholder authentication is available based upon the card's PAN, prepare a response, and send the response to the Directory Server 122.

At step 5, the Directory Server 122 returns the ACS response (or its own) to the MPI 134. If cardholder authentication is available, the response may include a custom URL (i.e., Uniform Resource Locator) of the Transaction Routing Service 124 (within the interoperability domain 120) and also of the issuer ACS 102 to which the merchant 132 will send a Payer Authentication Request.

At step 6, MPI 134 sends the Payer Authentication Request to the ACS 102. If cardholder authentication (or proof of an attempted authentication) is not available, then the MPI 134 may advise the merchant commerce server that authentication is not available, and processing continues with step 12 (see below). The MPI 134 may send the Payer Authentication Request to the ACS 102 via the Transaction Routing Service 124 via the cardholder's device (e.g., a browser or application executing on a desktop computer, mobile device, or other computing device) using the URL received in step 5. The Payer Authentication Request contains information about the purchase transaction.

In some embodiments, the MPI 134 opens a communication frame or window or overlay on the cardholder's browser on the cardholder's computer, and directs the communication frame or window to load a resource by contacting ACS 102 associated with the issuer 112 using the URL (possibly along with a parameter or datum that the ACS 102 can use to ascertain the account number (PAN) of the cardholder's card). In some embodiments, this URL identifies (or "is for") the transaction routing service 124.

For example, in some embodiments at step 6, the merchant 132 (using the MPI 134 and/or merchant commerce server), may transmit a message over HTTP to the computing device of cardholder 1. This message may include an URL of the transaction routing service 124, which causes the computing device of cardholder 1 to request a resource using that URL. Accordingly, the computing device of cardholder 1 transmits a request (at step 7A, described herein below) to the transaction routing service 124—which will then ultimately be forwarded on to the issuer's access control server 102.

At step 7A, the cardholder's computing device may utilize the URL to contact the Transaction Routing Service 124 with a Payer Authentication Request, which at step 7B receives the Payer Authentication Request and forwards it to the appropriate issuer ACS 102. In some embodiments, the messages sent in steps 7A and 7B may be HTTP messages.

At step 8A and 8B, the ACS 102 formats an authentication request for the cardholder and receives a response from cardholder 1. The authentication request may be returned via the Transaction Routing Service 124 to the browser/application running on the computing device of cardholder 1. Each of these messages, in some embodiments, may be HTTP response messages. The payload may cause the computing device of cardholder 1 to display an "authentication challenge" user interface, and thus the cardholder may be authenticated using processes applicable to the PAN (e.g., password, PIN entry, etc.).

For example, after clicking "Buy" at step 1, the cardholder 1 may see a user interface that contains purchase details, and may also see user interface elements (e.g., within a window or overlay, generated responsive to receipt of the authentication request message (e.g., HTML response message) received at step 8A) that prompts the cardholder 1 to provide his or her cardholder authentication password. The cardholder 1 may enter their password and submit the password (e.g., by clicking or selecting a button labeled "Submit"). This may trigger another message (e.g. an HTTP message), which may include the password or a representation of the password, to be transmitted at step 8B to the transaction routing service 124 and forwarded on to the ACS 102. The ACS 102 may determine whether the provided password is correct.

In other embodiments, instead of the authentication request passing to the Transaction Routing Service 124, the issuer access control server 102 can communicate with the cardholder's device directly without passing through the server computing device 125.

The ACS 102 may format a Payer Authentication Response with appropriate values, including authentication status and, if applicable, Electronic Commerce Indicator (ECI) and/or a Cardholder Authentication Verification Value (CAVV). The CAW may be utilized to confirm that an authentication, or proof of an attempted authentication, has been conducted. The ACS 102 may sign the Payer Authentication Response with the issuer's customer authentication Signature Key (e.g., provided by a payment processor operating the interoperability domain 120). This key can allow the merchant 132 to verify that the Payer Authentication Response originated from a valid participating issuer and that the message was not tampered with while it was on route.

At step 9A, the ACS 102 returns the signed Payer Authentication Response including authentication results to the Transaction Routing Service 124, which forwards the response toward the MPI 134 by sending it to the cardholder's device, at step 9B. In some embodiments, all of the messages sent at steps 9A and 9B are formatted and sent according to the HTTP protocol.

At step 9C, in some embodiments, whether or not authentication was successful, the ACS 102 may send a copy of the Payer Authentication Response, including related data to the Authentication History Server 128. At step 9D, in some embodiments, the Authentication History Server may provide an acknowledgement response that the Payer Authentication Response transaction data was received. The Authentication History Server may serve as a database for dispute resolution.

At step 10, the computing device of cardholder 1 forwards the signed Payer Authentication Response (received at step 9B) to the MPI 134. At step 11, the MPI 134 may process the received Payment Authentication Response. The MPI 134 may validate the signature on the Payer Authentication Response, along with other data included in the response and then pass the results of the authentication attempt to the merchant commerce server.

The merchant commerce server may determine whether merchant 132 may proceed with authorization and process and/or processing the transaction based on information received from the MPI 134. In some embodiments, if the merchant commerce server advises the MPI 134 that authentication failed, the merchant may request another form of payment from cardholder 1. If the merchant commerce server determines that proceeding with authorization is appropriate, the merchant commerce server may send an authorization request to the acquirer 136 via acquirer eCommerce payment gateway 135 at steps 11 and 12. The authorization request may include the Electronic Commerce Indicator (ECI) appropriate to the authentication status and a Cardholder Authentication Verification Value (CAW), if applicable.

At step 13, the acquirer 136 may send the authorization request to payment processing network 29. In some cases, the merchant commerce server may directly send the authorization request to payment processing network 129. In some embodiments, the authorization request may be a message formatted according to an ISO message format associated with the ISO messaging standard.

At step 14, the payment processing network 29 may send the authorization request to issuer 112, which may receive and process the authorization request. In some embodiments, either the issuer 112 or payment processing network 129, on the behalf of issuer 112, may perform verification of the CAVV.

At step 15, issuer 112 may choose to approve or decline an authorization request (e.g., based on insufficient funds, closed account, etc.) and return an authorization response including an authorization decision (e.g., approve or decline). In some embodiments, the authorization response may be a message formatted according to an ISO message format associated with the ISO messaging standard. Issuer 112 may send the authorization response to payment processing network 129.

At step 16-18, payment processing network 129 may forward the authorization response to merchant commerce server via acquirer 136 and acquirer eCommerce payment gateway 135. In some embodiments, merchant 132 may display an order confirmation including details about the order, delivery, and customer service to the browser or application executing on the computing device of cardholder 1.

II. Exemplary Enhanced Payer Authentication System

With regard to the system 200 of FIG. 2, issuers have traditionally utilized ISO-type messages (e.g., ISO 8583 messages) for performing payment transactions. Thus, although the cardholder authentication system of FIG. 2 may provide benefits to involved parties, it has sometimes been difficult for issuers to upgrade their existing (or "legacy") computing systems to utilize the HTTP messaging involved in steps 7A, 7B, 8A, 8B, 9A, 9B, etc.

Figure 3:
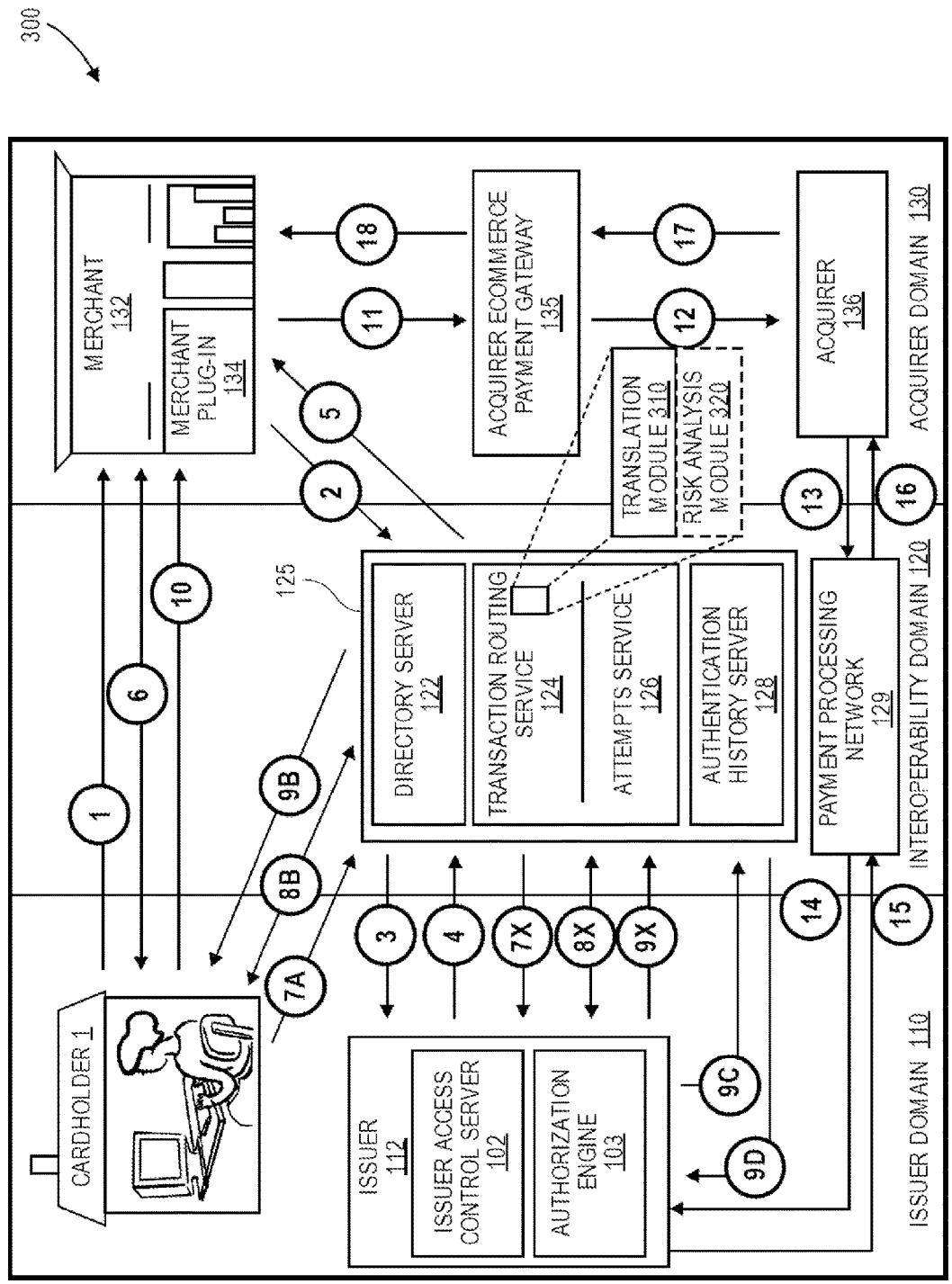
FIG. 3 illustrates a block diagram of an exemplary payment system with enhanced payer authentication according to embodiments of the invention.

For example, even when an issuer has implemented a system including this HTTP-based messaging scheme, the issuer also maintains both the HTTP system as well as the existing ISO-type message system, which creates added complexity, processing requirements, and maintenance time and effort. Thus, some issuers may choose to "outsource" the HTTP messaging functionalities by contracting with third parties. However, this split of functionality leads to the issuer—during the actual payment authorization stages of financial transaction processing where a transaction is approved or denied—not having visibility into the cardholder authentication process that was just completed, which potentially could help with risk assessment analysis that may occur during payment authorization. Accordingly, FIG. 3 presents an enhanced payer authentication scheme that eliminates these problems. For purposes of clarity, many of the specific steps and descriptions thereof that are made with respect to FIG. 2 can be included in FIG. 3 and those steps are not repeated in detail.

FIG. 3 illustrates a block diagram 300 of an exemplary payment system with enhanced payer authentication according to embodiments of the invention. In some embodiments, the payment system is able to "on-the-fly" translate between different messaging formats (and/or protocols) used by entities involved in a payment transaction. In this depicted embodiment, the system 300 includes, within the transaction routing service 124, a translation module 310 and optionally a risk analysis module 320. Moreover, in the depicted embodiment, message 7B is replaced with message 7X, message 9A is replaced with message 9X, and optionally messages 8A may be replaced with messages 8X.

As shown in FIG. 3, in some embodiments, the issuer 112 may include the issuer access control server 102 and an authorization engine 103. The access control server 102, as described above, may be a server computing device storing and/or accessing registered cardholder account and access information. In some embodiments, some of the functionality of the access control server 102 may reside at the authorization engine 103.

In some embodiments, the issuer access control server 102 may directly receive messages (e.g., message 7X) from transaction routing service 124 and process the messages. For example, the issuer access control server 102 may receive a message and determine a message type (e.g., whether the message is an authentication or authorization message) of the message. The issuer access control server 102 may then conduct further processing as appropriate following the determination of message type as described below.

However, embodiments are not limited to issuers that have access control servers within their systems. If an issuer does not have an access control server, a different approach may be taken. For example, the issuer may receive a message and detect a message type. The issuer may then send the message, along with the determination of the message type, to the authorization engine for further processing. This can allow issuers that may not necessarily have access control servers to still carry out the translation of messages as described herein. Further, fraud algorithms used for authorization by authorization engine 103 may be utilized in an authentication process to supplement an authentication algorithm.

In other cases, an issuer may have both an access control server and authorization engine, and the issuer may define how to allocate specific processing that may be conducted by each. In some cases, the authorization engine 103 may route messages to the issuer access control server. The exemplary flow below describes an issuer ACS 102 that may directly receive a message from transaction routing service 124.

Translation module 310 may comprise a software module including code that enables modification of a received message and transmission of a modified message. For example, translation module 310 may convert a message received formatted according to a first message format (e.g., HTTP standard) to another message formatted according to a second message format (e.g., ISO standard), as well as convert a received message formatted according to the second message format to another message formatted according to the first message format. Additionally, translation module 310 may include additional information (e.g., device information, transaction information, routing information, etc.) into a message during conversion. In some embodiments, translation module 310 may communicate with the risk analysis module 320 to receive risk information, which may be included into a message.

Risk analysis module 320 may comprise a software module including code that enables performance of a risk assessment based on information in a received message. For example, risk analysis module 320 may conduct a risk analysis based on device information, network information, and other user information that may be included in a received authentication request message. The risk analysis module 320 may generate one or more risk analysis output values, which may indicate the result of risk analysis. The risk analysis output values may include a risk assessment value, which may be a combination of any suitable number, alphanumeric characters, range, threshold, or other values that indicate risk associated with authentication. In some embodiments, the risk analysis output values, such as the risk assessment value, may be included in a modified authentication request message.

In an embodiment of the invention, the flow of messages occurring between the cardholder 1 computing device and the issuer 112 (via the transaction routing service 124)—according to a first message format (here, HTTP messages)—is modified such that the cardholder computing device continues to transmit/receive messages (e.g., steps 7A, 8B, 9B) according to the first message format, but the issuer ACS 102 instead communicates (at one or more of steps 7X, 8X, and 9X) using a second message format (e.g., ISO-type messages). In some embodiments, all messages between the cardholder computing device and the transaction routing service 124 (e.g., steps 7A, 8B, 9B) occur using HTTP, and all messages between the transaction routing service 124 and the issuer 112 (steps 3, 4, 7X, 8X, and 9X) occur using ISO messages (e.g., ISO 8583 messages). In such embodiments, no changes are required for the merchant 132 and/or merchant plug-in 134 and/or cardholder 1, and the issuer 112 may make simple adjustments to legacy systems already using ISO-type messages to allow it to understand the new ISO-type messages—and thus, not need to implement an entirely new message format, protocol and/or outsource the cardholder authentication processes.

Thus, in some embodiments, upon receipt of a Payer Authentication Request message (at step 7A), instead of forwarding it to the issuer ACS 102, a translation module 310 will instead translate portions of (or all of) the Payer Authentication Request message into an ISO message. The ISO message may be an existing ISO message traditionally used for another purpose (e.g., an ISO 8583 message of type "authorization message", "administrative message", etc.) or a new type of single-purpose or multi-purpose ISO message. This translated ISO message is then sent to the issuer (e.g., issuer ACS 102, though it may be another type of server computing device such as a dedicated authorization or risk server) at step 7X. At step 8X, the issuer may send an authentication request formatted in an ISO message, which the translation module 310 may receive, translate into an HTTP message (e.g., including HTML, JSON, AJAX, XML, etc.), and send as part of step 8B. As described above, steps 8B and now 8X (in lieu of step 8A) may represent a number of messages flowing back and forth from the cardholder computing device and the ACS 102, and all of these messages may be translated back-and-forth by the translation module 310 such that the cardholder computing device sends/receives HTTP messages, and the issuer ACS 102 sends/receives ISO messages.

Ultimately, the ACS 102 will return Authentication Results at step 9X in an ISO-type message, which the translation module 310 will again translate back into an HTTP message and send to the cardholder computing device at step 9B.

In some embodiments, the transaction routing service 124 further comprises a risk analysis module 320 that may collect information from the communications between the cardholder 1 computing device and the transaction routing service 124 (e.g., at messages 7A, 8B, and/or 9B). This information may include a device identifier of the cardholder computing device, a device fingerprint, values from cookies used by the cardholder computing device, network addresses used by the cardholder computing device (e.g., an IP address), identifiers of traffic/network paths of the cardholder's messages, hashes of any of the previously mentioned data values, and/or any other data values accessible to the transaction routing service 124 from its interactions with the cardholder (e.g., any values from any protocol headers used to transport the data, including but not limited to IP header values, TCP/UDP header values, HTTP header values, etc.).

The risk analysis module 320 may process this information (e.g., send queries to risk analysis services) and may generate its own risk analysis output value(s) (e.g., one or more risk scores). In some embodiments, some or all of the collected information and/or the risk analysis output values may be provided to the issuer ACS 102 within one or more of the ISO-type messages represented by steps 7X, 8X, and 9X. In some embodiments, the risk analysis module 320 may transform the collected information, including but not limited to translating an IP address of the cardholder device into a geolocation value (based upon a geolocation database) that identifies a geographic location of the cardholder device. The issuer ACS 102, then, may receive the collected information and/or risk analysis output values, and may base its cardholder authentication and/or subsequent payment authorization decisions based upon this data. Thus, the issuer ACS 102 may gain additional insight into the cardholder and/or computing device used by the cardholder that would typically not be available in order to better perform authentication and/or payment authorization.

Figure 4:
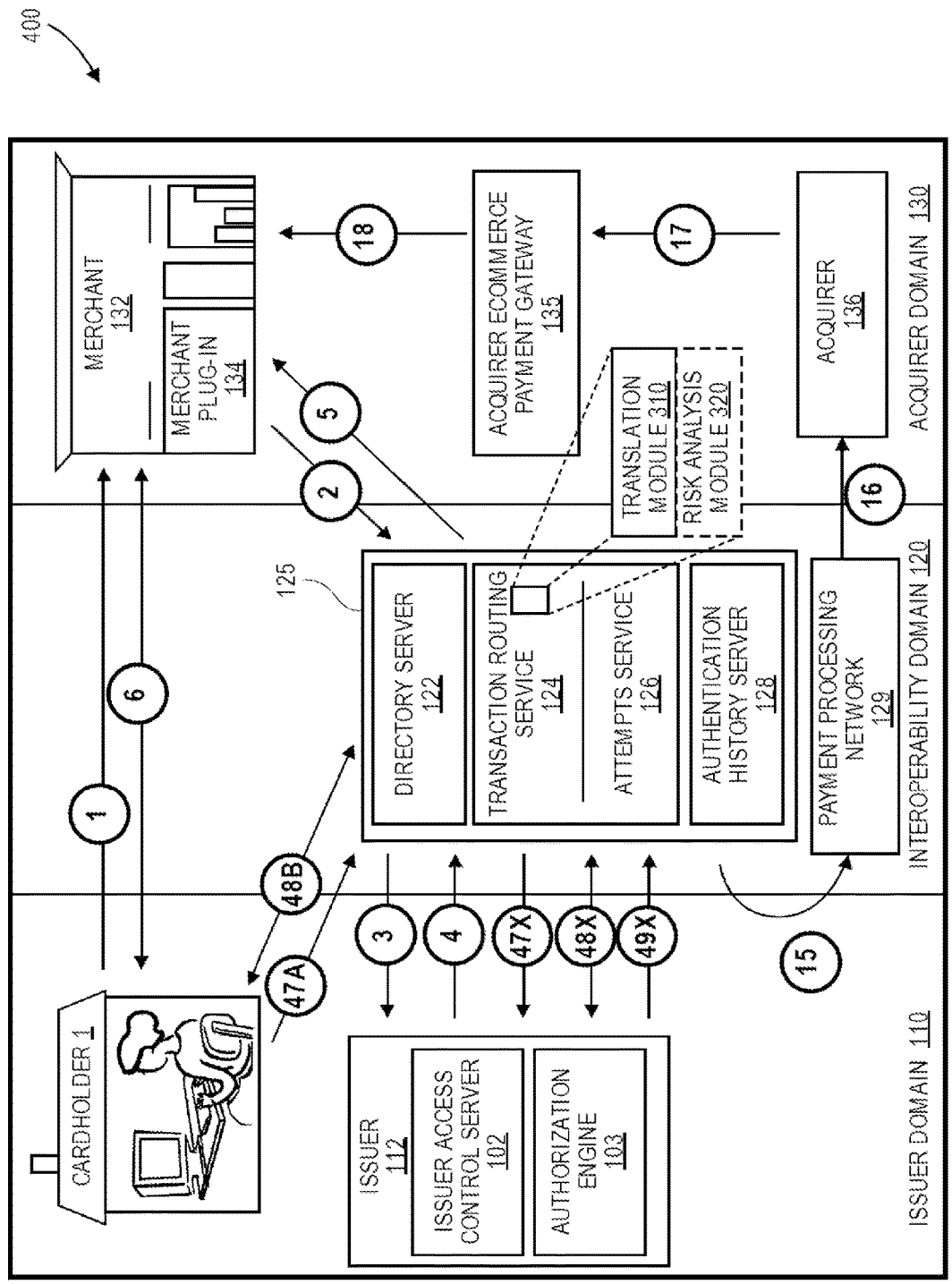
FIG. 4 illustrates a block diagram of an exemplary payment system with enhanced payer authentication according to embodiments of the invention.

FIG. 4 illustrates a block diagram 400 of an exemplary payment system with enhanced payer authentication according to embodiments of the invention. In some embodiments, the payment system is able to "on-the-fly" translate between different messaging formats (and/or protocols) used by entities involved in a payment transaction, as well as complete an authorization process as part of an authentication process. For purposes of clarity, many of the specific steps and descriptions thereof that are made with respect to FIG. 2 can be included in FIG. 4 and those steps are not repeated in detail.

In this depicted embodiment, the system 400 includes, within the transaction routing service 124, a translation module 310 and optionally a risk analysis module 320. Moreover, compared to embodiments discusses with respect to FIG. 2, in the depicted embodiment, message 7A is replaced with message 47A, message 7B is replaced with message 47X, messages 8A are replaced with messages 48X, message 9A is replaced with message 49X, and messages 8B are replaced with messages 48B. Further, several steps can be omitted, including steps 9B, 9C, 9D, and steps 10 through 14, since this embodiment can combine authentication and authorization processes.

Steps 1 through 6 shown in FIG. 4 may be the similar to steps 1 through 6 as described with respect to FIG. 2. After a transaction is initiated between a computing device of cardholder 1 and merchant 132, step 47A may be performed.

At step 47A, the computing device of cardholder 1 may send an authentication request message to server computing device 125. The authentication request message may include authentication information and authorization information, such that issuer 112 may conduct both authentication and authorization processes when the authentication request message is received. In some embodiments, the authentication request message may include all fields that may be sent in a typical authorization message (e.g., with a message type indicator of 0100), in addition to information that may be utilized to authenticate cardholder 1. For example, the authentication request message may include a device identifier, merchant identifier, card verification value (CVV), transaction amount, etc. The authentication request message may be formatted according to a first message format, such as a HTTP message format.

Server computing device 125 may receive the authentication request message and convert the received message into a modified authentication request message. Translation module 310 may process the authentication request message to generate the modified authentication request message, which may be formatted according to second message format, such as an ISO message format. Translation module 310 may include in the modified authentication request message a risk analysis result generated by risk analysis module 320 based on the received authentication request message. Translation module 310 may also include in the modified authentication request message the authentication and authorization information included in the received authentication request message. This can ensure that any data that may be utilized for authentication and authorization processes by issuer 112 may be available in the modified authentication request message.

At step 47X, server computing device 125 may send the modified authentication request message to issuer 112. Issuer 112 may then initiate authentication and authorization processes based on the received modified authentication request message. This is possible because the modified authentication request message is formatted in a message format (e.g., ISO format) that is capable of being processed by authorization systems of issuer 112 and thus may include authentication information that is typically not available. In some embodiments, the issuer access control server 102 and authorization engine 103 may perform certain authentication and authorization processes. However, in some embodiments in which issuer 112 does not have access control server systems, the authorization engine 103 may be capable of performing the authentication and authorization processes, enabling the flow of FIG. 4 to be conducted with issuers without access control server systems.

In some embodiments, upon receiving the modified authentication request message, issuer 112 may choose to conduct a step-up authentication in which a challenge may be generated and sent to the computing device of cardholder 1 via server computing device 125 at step 48X. The message sent to server computing device 125 at step 48X may be formatted according to the second message format (e.g., ISO format) and include a challenge request. Upon receiving the message from issuer 112, server computing device 125 may translate the received message to be formatted according to the first message format (e.g., HTTP format) by translation module 310.

At step 48B, the server computing device 125 may send the message formatted according to the first message format (e.g., HTTP format) including the challenge request to the computing device of cardholder 1. Cardholder 1 may then perform the challenge (e.g., answer a security question) and input a response into their computing device. A message formatted according to the first message format (e.g., HTTP format) including the challenge response may be sent back to server computing device 125.

Server computing device 125 may then translate the received message into a message formatted according to the second message format (e.g., ISO format) including the challenge response by translation module 310, and then return the translated message to issuer 112 at step 48X.

Issuer 112 may then receive the message formatted according to the second message format (e.g., ISO format) including the challenge response and verify the challenge response. If the challenge response can be verified, issuer 112 may authenticate cardholder 1 and analyze authorization information (e.g., sent at step 47A and 47X) to determine an authorization result. Subsequently, issuer 112 may generate an authorization response message including the authorization result formatted according to the second message format (e.g., ISO format). In some embodiments, this authorization response message may signify a request response message function (e.g., by a message type indicator of 0110). In some embodiments, the authorization response message may be known as an authentication response message that includes the authorization result.

At step 49X, issuer 112 may send the authorization response message to server computing device 125. Subsequently, the authorization response message may be sent to merchant 132 via payment processing network 129, acquirer 136, and acquirer eCommerce payment gateway 135, as shown in steps 15 through 18. Prior to sending the authorization response message to the merchant 132, the authorization response message could be further modified by the server computing device 132. For example, risk scores determined by the server computing device 132 could be added to the authorization response message before transmitting it back to the merchant 132. Merchant 132 may receive the authorization response message including the authorization result and determine whether the transaction should be completed.

Embodiments described in FIG. 4 enable an authorization process to be combined with an authentication process. Since an issuer may receive authentication and authorization information in a single message formatted according to an ISO message format compatible with systems of the issuer, several steps may be omitted from a typical transaction flow that separately performs authentication and authorization processes. Compared to the process flow shown in FIG. 3, the process flow in FIG. 4 has fewer steps and can thus improve transaction speed as well as reduce required computing resources to perform authentication and authorization processing.

Other variations on the method shown in FIG. 4 are also possible. For example, instead of sending an authorization response message through the payment processing network 129, acquirer 136, and gateway 135, the server computing device 125 can send the authorization response message directly back to the merchant 132 or it could be routed through the device operated by the cardholder 1 and as it passes to the merchant 132.

III. Exemplary Methods

Methods for exemplary systems are described below with reference to FIG. 3 and FIG. 4, and with further reference to the system elements presented in other figures herein. However, the methods described below are exemplary in nature, and are not intended to be limiting. Methods in accordance with some embodiments described herein may include (or omit) some or all of the steps described below, and may include steps in a different order than described herein.

Figure 5:
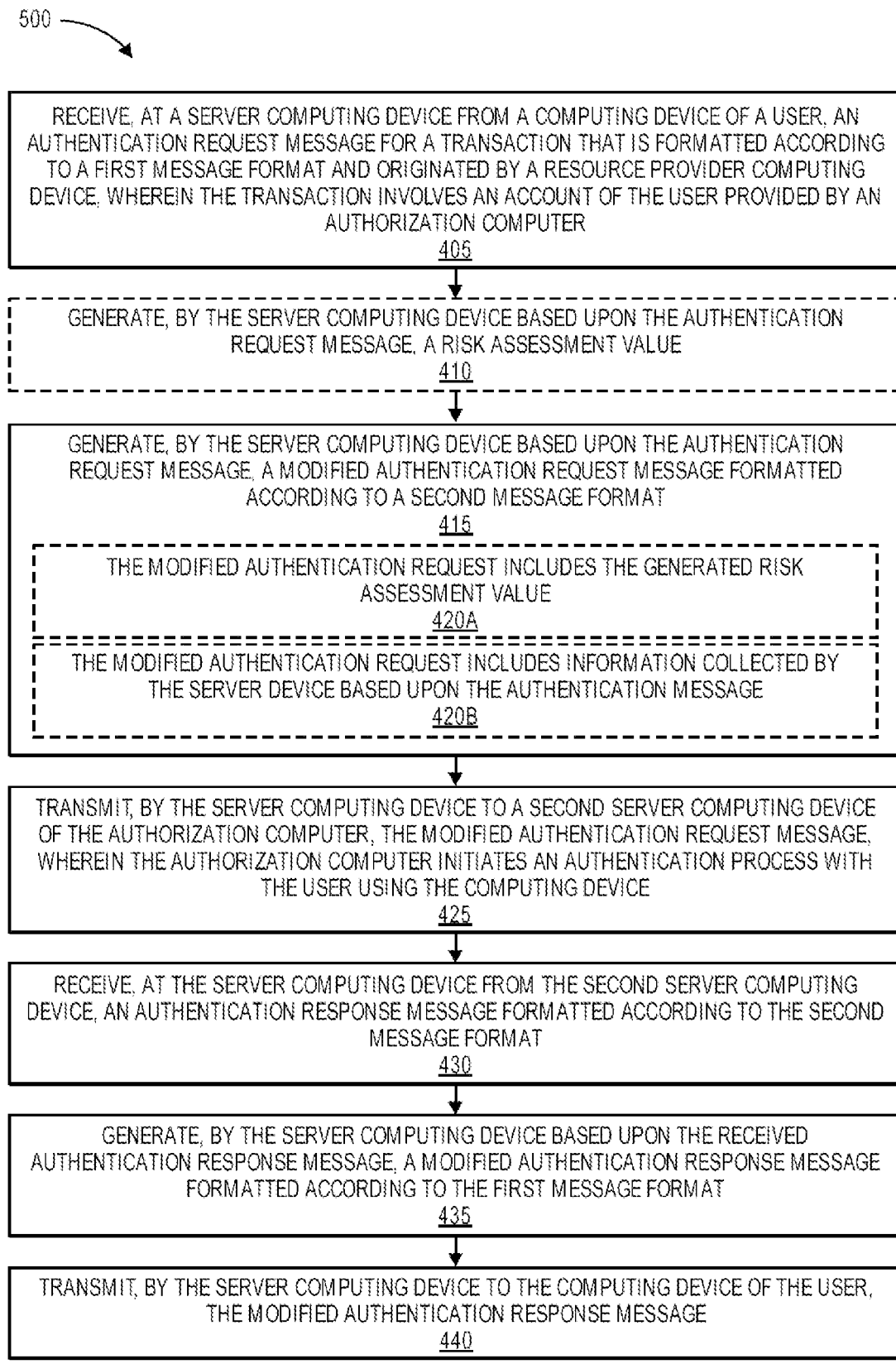
FIG. 5 illustrates a flow in a server computing device for performing a financial transaction according to embodiments of the invention.

FIG. 5 illustrates a flow 500 in a server computing device for performing a financial transaction according to embodiments of the invention. In some embodiments, the flow 500 is performed by transaction routing service 124 of FIG. 3 and FIG. 4, but in other embodiments some or all of flow 500 may be performed by entities including but not limited to directory server 122, transaction module 310, and risk analysis module 320.

At block 405, the flow includes receiving, at a server computing device from a computing device of a user, an authentication request message for a transaction. In some embodiments, the authentication request message may be a payer authentication request message and the transaction may be a financial transaction. The payer authentication request message is formatted according to a first message format and originated by a resource provider computing device (e.g., merchant computing device), and the financial transaction involves an account of the user provided by an authorization computer (e.g., issuer). In some embodiments, the first message format is defined according to the HTTP messaging standard, and the payer authentication request message may be an HTTP "GET" or "POST" message. In some embodiments, the URL used by the computing device of the user to send the payer authentication request message was received from a merchant server computing device, and thus, the payer authentication request message may be said to be originated by the merchant and routed through (or via) the user computing device.

Optionally, in some embodiments, the flow includes at block 410 generating, by the server computing device based upon the authentication request message, a risk assessment value 410. The risk assessment value may be based upon one or more items of collected information from the payer authentication request message (or other messages) sent by the user computing device. The risk assessment value may be a numeric score (e.g., a value between 0-100, 1-100, 1-10, etc.), an alphanumeric value, a set of attribute-value pairs, etc.

At block 415, the flow 500 includes generating, by the server computing device based upon the authentication request message, a modified authentication request message. The modified payer authentication request message is formatted according to a second message format, which in some embodiments is an ISO message format, and in some embodiments is the ISO 8583 message format. In some cases, at block 420A, the modified payer authentication request message includes the generated risk assessment value. In some embodiments, at block 420B, the modified payer authentication request message includes the collected information relating to the cardholder and/or computing device of the cardholder and/or the network path of traffic sent by the computing device.

As described above, the collected information may include one or more of a device identifier of the cardholder computing device, a device fingerprint, values from cookies used by the cardholder computing device, network addresses used by the cardholder computing device (e.g., an IP address), identifiers of traffic/network paths of the cardholder's messages, a feature identifier that identifies technological capabilities or configurations of the computing device (e.g., whether cookies are enabled, whether a Flash multimedia player is installed/enabled, whether JavaScript is enabled, etc.), hashes of any of the previously mentioned data values, and/or any other data values (e.g., any values from any protocol headers used to transport the data, including but not limited to IP header values, TCP/UDP header values, HTTP header values, etc.). In some embodiments, some of the collected information may be transformed (e.g., into a geolocation value) and included in the modified payer authentication request message.

At block 425, the flow 500 includes transmitting, by the server computing device to a second server computing device of the authorization computer, the modified authentication request message, wherein the authorization computer initiates an authentication process with the user using the computing device. In some embodiments, the authorization computer may be an issuer computer that issued an account of the user. In some cases, the modified payer authentication request message is an ISO-type message formatted according to an ISO message format and may be received by a same server computing device (or set of server computing devices) that performs payment authorization.

At block 430, the flow 500 includes receiving, at the server computing device from the second server computing device, an authentication response message formatted according to the second message format. In some embodiments, the payer authentication response message is formatted according to an ISO message format.

At block 435, the flow 500 includes generating, by the server computing device based upon the received authentication response message, a modified authentication response message formatted according to the first message format. In some embodiments, the modified payer authentication response message comprises data (e.g., HTML, JavaScript, XML, etc.) formatted and transported using HTTP.

At block 440, the flow 500 includes transmitting, by the server computing device to the computing device of the user, the modified authentication response message. In some embodiments, the modified authentication response message may include an authentication result to help the merchant determine whether processing of the transaction may proceed.

At a later time following authentication, an authorization process may be initiated for the transaction. This authorization process may utilize authorization messages formatted according to the second message format (e.g., ISO standard). For example, the server computing device may send an authorization request message formatted according to the second message format to an issuer, and receive an authorization response message formatted according to the second message format from the issuer. Hence, messages formatted according to the second message format may be utilized for both authentication and authorization processes.

This feature has several advantages. For example, this can enable the access control server or associated issuer computer to forgo the need for systems to process multiple messaging message format associated with multiple messaging standards, help consolidate customer authentication and payment authorization logic/systems, as well as utilize data from the authentication phase in the authorization phase, which may not be typically available. This can result in better transaction authorization, since more relevant data related to the user, computing device of the user, and network information of the transaction may be taken into account.

Figure 6:
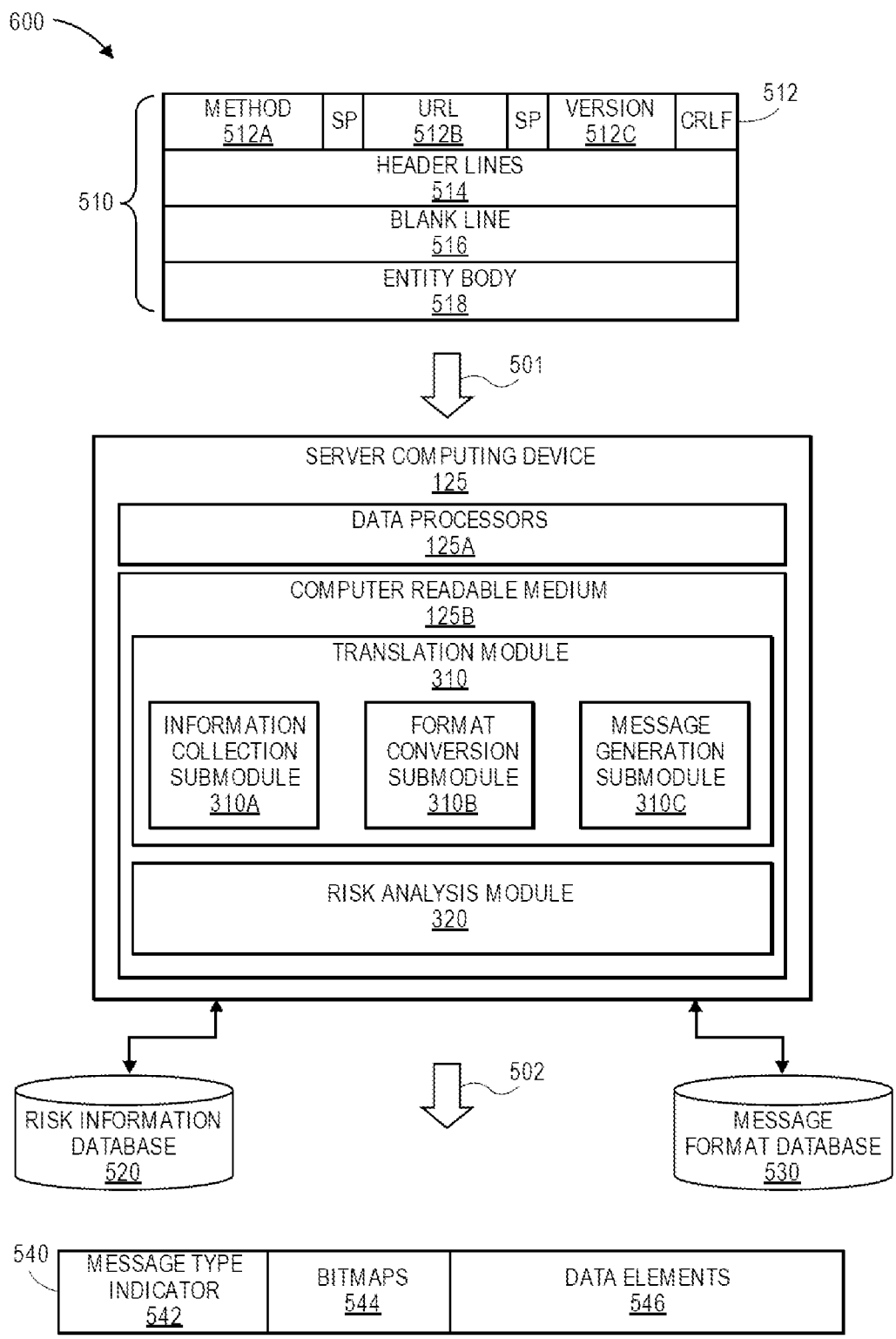
FIG. 6 illustrates a flow in a server computing device for translating a message according to embodiments of the invention.

FIG. 6 illustrates a flow 600 in a server computing device for translating a message according to embodiments of the invention. In some embodiments, the translated message may be a modified message. FIG. 6 includes a first message 510 formatted according to a first message format associated with a HTTP standard, server computing device 125 including translation module 310 and risk analysis module 320, and a second message 540 formatted according to a second message format associated with an ISO standard. In some embodiments, server computing device 125 may have similar features to those described for server computing device 125 in FIG. 3 including a transaction routing service that may comprise the translation module 310 and the risk analysis module 320.

In some embodiments, the first message 510 may be a payer authentication request message formatted according to a HTTP message format (e.g., HTTP request message). For example, a user operating a computing device may wish to conduct an online transaction with a merchant, which may conduct payer authentication. The computing device of a user may communicate an authentication request message to an ACS via server computing device 125. Characteristics of server computing device 125, first message 510, and second message 540 are described below.

The server computing device 125 may comprise data processors 125A and a computer readable medium 125B comprising translation module 310 and risk analysis module 320. The computer-readable medium 125B may be coupled to the data processors 125A, the computer-readable medium 125B comprising code, executable by the data processors 125A, for performing methods described herein. Translation module 310 may comprise code to enable processing of the first message 510 formatted according to a HTTP message format and generating a modified message, second message 540, formatted according to an ISO message format. In some embodiments, translation module 310 may include information collection submodule 310A, format conversion submodule 310B, and message generation submodule 310C. Risk analysis module 320 may conduct a risk assessment based on information collected by server computing device 125.

In some embodiments, server computing device 125 may be in communication with risk information database 520 and message format database 530, which may include information to assist server computing device 125 to perform functions of translation module 310 and risk analysis module 320. In some embodiments, the risk information database 520 and message format database 530 may include one or more software libraries and configuration files and/or may be third-party databases.

The message format database 530 may include any information related to one or more messaging formats associated with messaging standards. For example, the message format database 530 may include field types, attributes, and lengths related to a message format associated with a first standard and a message format associated with a second standard. Additionally, the message format database 530 may include correlation information about fields related to the message format associated with the first standard and fields related to the message format associated with the second standard.

In some embodiments, information stored in message format database 530 may be issuer specific. For example, the message format database 530 may comprise multiple data records related to multiple issuers, where each issuer may have different configurations of field types, attributes, and lengths. In some cases, certain issuers may have defined unique fields that another issuer may not utilize. Hence, each data record associated with each issuer may include information indicating the issuer-specific configurations. Thus, the server computing device 125 may detect the issuer related to the transaction (e.g., by an issuer identifier) and query the message format database 530 for information related to the specific issuer and utilize the information for the translation process.

Risk information database 520 may include any information that may be helpful for conducting a risk analysis. For example, the risk information database 520 may include historical transaction information, historical risk analysis outputs, and statistics related to the historical transaction and risk analysis results.

The first message 510 may include a request line 512 comprising a method 512A field, a URL 512B field, and a version 512C field, header lines 514, a blank line 516, and an entity body 518. The method 512A field, the URL 512B field, and the Version 512C field may each be separated by a space, and request line 512 may be terminated by a carriage return (CR) and line feed (LF). The method 512A field may indicate which type of request first message 510 contains. The method 512A field may take on several different values, including "GET", "POST", and "HEAD". The URL 512B field may include a URL that may direct the first message 510 to an entity to which the payment authentication request is meant to be sent. For example, the URL 512B field may include a URL of the transaction routing service, which may be part of server computing device 125 (See FIG. 3 and FIG. 4). In some embodiments, the URL included in the URL 512B field may be received at the computing device of the user from a merchant server computing device associated with the merchant. The version 512C may denote a HTTP version (e.g., HTTP/1.0, HTTP/1.1) of the first message 510.

The first message 510 may also include header lines 514, which can provide one or more parameters of a HTTP transaction. For example, the headers lines 514 may include information surrounding a resource being requested by the first message 510 or the behavior of the server or the computing device from which the first message 510 is sent. In some implementations, the header fields included in header lines 514 may be colon-separated name-value pairs. For example, the header field "Accept: text/html" may indicate that the browser sending the first message 510 is prepared to accept HTML text in response to its request. The end of each name-value pair may be terminated by a carriage return and line feed character sequence. The termination of all header lines 514 may be indicated by an additional carriage return and line feed character sequence, indicated by blank line 516. The header fields included in header lines 514 may include any suitable operating parameters associated with the transaction.

The first message 510 may also include entity body 518. In some embodiments, the entity body 815 may not be utilized when the first message 510 is sent. For example, the first message 510 may be a "GET" message (indicated by the method 512A field), which may simply request a resource from a server without including information in entity body 518. In another example, the first message 510 may be a "POST" message (indicated by the method 512A field), which may utilize entity body 518. In this case, the entity body 518 may include user input information entered by the user into the browser, which may be sent to the server.

The second message 540 may be an International Organization for Standardization (ISO) 8583 message, which can include a message type indicator 542. The message type indicator 542 may be a four digit numeric field indicating the ISO 8583 version, the Message Class, the Message Function, and the Message Origin.

Position one of the message type indicator 542 may indicate the ISO 8583 version, as shown by the exemplary values and corresponding meanings in the table below.

| Value | Meaning |
|---|---|
| 0xxx | 1987 version |
| 1xxx | 1993 version |
| 2xxx | 2003 version |
| 3xxx to 7xxxx | Reserved for ISO use |
| 8xxx | Reserved for National use |
| 9xxx | Reserved for Private Use |

Position two of the message type indicator 542 may indicate the Message Class, as shown by the exemplary values and corresponding meanings in the table below. When an authentication message formatted according to a HTTP message format is translated into a modified message formatted according to an ISO message format, the modified message may be generated as a ISO-type message that is traditionally utilized for another purpose (e.g., an ISO 8583 message of type "authorization message", "administrative message", etc.). In some implementations, the modified message may be generated as a new type of single-purpose or multi-purpose ISO message.

| Value | Meaning |
|---|---|
| x0xx | Reserved by ISO |
| x1xx | Authorization Message |
| x2xx | Financial Messages |
| x3xx | File Actions Message |
| x4xx | Reversal and Chargeback Messages |
| x5xx | Reconciliation Message |
| x6xx | Administrative Message |
| x7xx | Fee Collection Messages |
| x8xx | Network Management Message |
| x9xx | Reserved for ISO use |

Position three of the message type indicator 542 may indicate the Message Function, as shown by the exemplary values and corresponding meanings in the table below.

| Value | Meaning |
|---|---|
| xx0x | Request |
| xx1x | Request Response |
| xx2x | Advice |
| xx3x | Advice Response |
| xx4x | Notification |
| xx5x | Notification Acknowledgement |
| xx6x | Instruction |
| xx7x | Instruction Acknowledgement |
| xx8x and xx9x | Reserved for ISO use |

Position four of the message type indicator 542 may indicate the Message Origin, as shown by the exemplary values and corresponding meanings in the table below. The Message Origin may indicate information about the entity that initiated the transaction.

| Value | Meaning |
|---|---|
| xx0x | Acquirer |
| xx1x | Acquirer Repeat |
| xx2x | Card Issuer |
| xx3x | Card Issuer Repeat |
| xx4x | Other Originator |
| xx5x | Other Originator Repeat |
| xx6x to xx9x | Reserved for ISO |

The second message 540 may further include bitmaps 544, which may be a field that contains information about which data element fields (in data elements 546) are present or absent in the second message 540. In some embodiments, bitmaps 544 may be represented by hexadecimal numbers. Each bit in bitmaps 544 may correspond to a data element, where a value of zero may indicate that the corresponding data element is not present and a value of one may indicate that the corresponding data is present. For example, hexadecimal value "0xB210" may correspond to bit values "1011001000010000," which may indicate the presence of data elements 1, 3, 4, 7, and 12. While this example shows a total of 16 corresponding data elements for simplicity, bitmaps 544 may typically be 16 hexadecimal characters corresponding to 64 data elements. In some embodiments, bitmaps 544 may include a first bitmap corresponding to data elements 1 through 64 and a second bitmap corresponding to data elements 65 through 128. In some implementations, a value of 1 for the first bit of the first bitmap may indicate that the second bitmap exists. In other embodiments, additional bitmaps may exist corresponding to additional data elements.

The second message 540 may include data elements 546, which may actually contain information about a transaction. The ISO message format may specify each data element with a format, attribute and length. For example, each data element may be assigned to certain permitted content (e.g., numeric, alphanumeric, special characters, binary, etc.) and permitted length (e.g., fixed, variable length below set maximum, etc.). In some cases, data elements that may have variable length may be preceded by length indicator (e.g., first two digits indicate length). Data elements 546 may include ISO-defined data elements corresponding to data fields 1 through 128, which may each be associated to a type and usage. For example, data field 2 may be defined for a Primary account number (PAN) and may be of numerical type with variable length up to 19 digits and including a length indicator in the first two bits.

In some embodiments, the translated the second message 540 may include data element fields that may not be typically defined in an ISO-type message format. For example, unique fields may be added within data elements 546 to include data extracted from the first message 510. In some embodiments, the additional fields may be input as one or more subfields into existing ISO defined data element fields. For example, a data element field may allocate a certain number of bits within the data element field for each subfield. This may enable the second message 540 to include additional information without changing the field types that another entity receiving the message may be capable of processing. In some embodiments, the data element fields may include a tag identifier element, a length element, and a value element. The tag identifier element may be a value indicating a characteristic of the data element (e.g., device-specific identifier, merchant-specific identifier, etc.), the length element may be a value indicating the length of the value element, and the value element may include a substantive value associated with the data element.

As described above, the first message 510 and the second message 540 can have significantly varying formats. Server computing device 125 may be capable of generating a modified message, the second message 540, based on receiving the first message 510. In some embodiments, the first message 510 may be a payer authentication request formatted according to a HTTP message format.

At step 501, the first message 510 may be sent to server computing device 125 (e.g., step 7A of FIG. 3). Upon receiving the first message 510, server computing device 125 may extract information included in the first message 510 by the information collection submodule 310A of translation module 310.

The information collection submodule 310A may comprise code to enable obtaining data from the first message 510. In some embodiments, the information collection submodule 310A may utilize information included in message format database 540 to recognize characteristics of the fields of first message 510. For example, since the first message 510 is a HTTP message, information collection submodule 310A may retrieve information related to the HTTP message format from the message format database 540. The information may include the types of fields (e.g., method, URL, Version, etc.) included in the first message 510, the format (e.g., division between header fields by CRLF, name-value pairs in header fields, length of fields, etc.), and other suitable information. Accordingly, the information collection submodule 310 may, in conjunction with data processors 125A, extract information from the first message 510 including data in header lines 514, which may include one or more operational parameters of the transaction. In some embodiments, the header lines 514 may include information about the computing device of the user from which the first message 510 was sent, as well as network information related to the computing device.

In some embodiments, the information collection submodule 310A may send the information extracted from the first message 510 to risk analysis module 320. As described above, the information may include device information (e.g., device identifier, device fingerprint, network addresses and values from cookies used by the device, network address, etc.) and network information (e.g., IP address, identifiers of traffic and network paths of message, values from cookies used by the device, etc.).

Risk analysis module 320 may comprise code to enable performing a risk assessment based on information in a received message. Risk analysis module 320 may receive information obtained by information collection submodule 310A, which may then be utilized for a risk analysis. In some embodiments, risk analysis module 320 may, in conjunction with data processor 125A, send queries to risk analysis services, which may be part of server computing device 125 or other third-party entities. In some cases, risk analysis module 320 may utilize information stored in risk information database 520 to conduct the risk assessment. For example, the risk information database 520 may include historical information surrounding the user and computing device conducting the transaction. The risk analysis module 320 may, in conjunction with data processors 125A, determine whether there are any abnormal patterns in the received information compared to the historical information. Ultimately, the risk analysis module 320 may, in conjunction with data processors 125A, generate one or more risk analysis outputs (e.g., risk scores, risk assessment scores, etc.) associated with the first message 510. In some embodiments, the risk analysis outputs may be sent to message generation submodule 310C. After information that may be included in the modified message is obtained (e.g., data extracted by information collection submodule 310A and risk analysis output by risk analysis module 320), format conversion submodule 310B may initiate conversion of the first message 510.

The format conversion submodule 310B may comprise code to enable determination of information that may be utilized to translate messages between two formats. The format conversion submodule 310B may, in conjunction with data processors 125A, determine information related to correlation of field types between the first message format (e.g., HTTP standard) of the first message 510 and the second message format (e.g., ISO standard) of second message 540. In some embodiments, this information may be retrieved from message format database 530, which may store a mapping of similar field types between the first message format and the second message format. For example, the message format database 530 may indicate that certain header fields stored in header lines 514 of the first message 510 can be associated with specific data element fields in data elements 546 of the second message 540.

In some embodiments, the message format database 530 may also store the field type, attributes, and length associated with each of the correlated header fields according to the HTTP message format and data elements according to the ISO message format. Hence, this can enable format conversion submodule 310B to determine, in conjunction with data processor 125A, how the first message 510 may be parsed in order to extract appropriate field values, as well as how to insert values into the appropriate fields of the second message 540. The message generation submodule 310C may then utilize this information determined by the format conversion submodule 310B to generate the modified message, the second message 540, based on the first message 510.

The message generation submodule 310C may comprise code to enable generation of a modified message based on the received message. In some embodiments, the message generation submodule 310C may initially, in conjunction with data processors 125A, determine the length of the modified message to be generated (e.g., by information stored in message format database 530) and then initialize the second message 540 with the determined length. Subsequently, the message generation submodule 310C may, in conjunction with data processors 125A, insert the information extracted by information collection submodule 310A and, in some cases, the risk analysis output determined by risk analysis module 320 into the second message 540. In some embodiments, the information may be inserted based on the instructions regarding how to appropriately insert information into the second message 540 in accordance with the ISO message format determined by format conversion submodule 310B. For example, the message generation submodule 310C may recognize, based on information received from format conversion submodule 310B, to insert content from the first message 510 into a corresponding data element field of data elements 546, as well as update a bit corresponding to the inserted data element field to have a value of "1," in order to format the second message 540 according to the ISO message format.

At step 502, server computing device 125 may complete generation of the second message 540 and transmit the second message 540 to an issuer access control server (e.g., step 7X of FIG. 3). In some embodiments, the issuer access control server may then initiate an authentication of the user conducting the transaction.

Embodiments described above have several advantages. For example, some embodiments enable the access control server or associated issuer computer to forgo the need for systems to process multiple messaging formats (e.g., HTTP standard and ISO standard), which can save computing resources. Additionally, some embodiments allow for issuers to consolidate customer authentication and payment authorization logic/systems, which may not typically be possible when the issuer is limited to utilizing ISO-type messages for authorization, while communicating with HTTP messages for authentication. Further, some embodiments enable issuers to easily utilize data from the customer authentication phase (e.g., device and network information extracted from the first message 510 and included in the second message 540) in the payment authorization phase that typically would not be available, since embodiments enable the authentication and authorization systems of an issuer to process all messages with a single message format.

While embodiments above describe translation between a HTTP message and an ISO message, embodiments are not so limited. For example, the flow and systems of FIG. 6 may be applicable for message translation between any other messaging formats. In some embodiments, the flow in FIG. 6 may be applicable to translating an ISO message to a HTTP message (e.g., corresponding to steps 8X, 9X, 9A, 9B of FIG. 3), where the first message formatted as a ISO message is sent from the issuer to the server computing device comprising the translation module, which then generates a second message formatted as a HTTP message that is sent to the computing device of the user based on the received ISO message. An exemplary case in described with respect to FIG. 7. In some implementations, the messages may not be directed towards a financial transaction.

Figure 7:
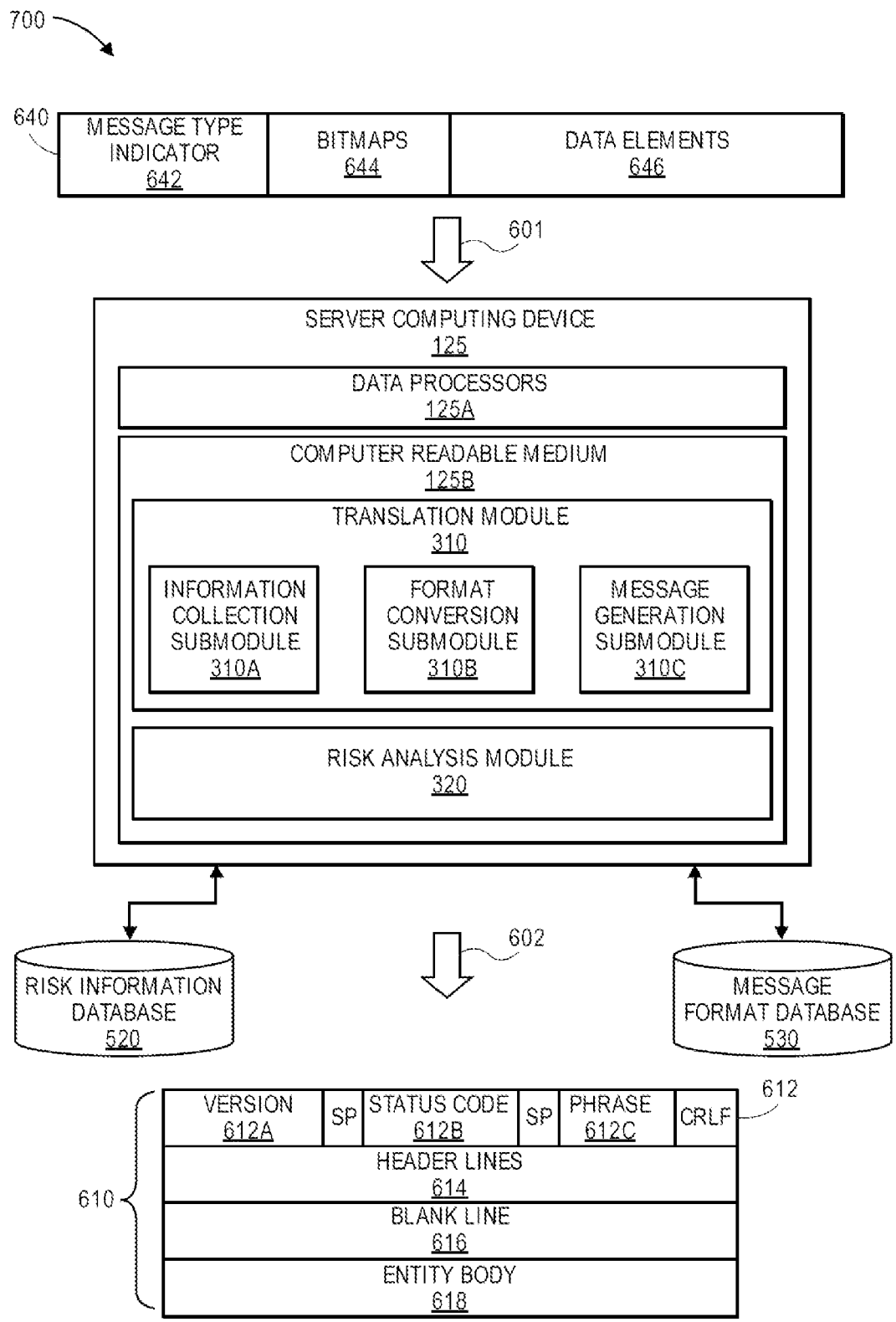
FIG. 7 illustrates a flow in a server computing device for translating a message according to embodiments of the invention.

FIG. 7 illustrates a flow 700 in a server computing device for translating a message according to embodiments of the invention. In some embodiments, the translated message may be a modified message. FIG. 7 includes a first message 640 formatted according to a second message format associated with an ISO message format, server computing device 125 including translation module 310 and risk analysis module 320, and a second message 610 formatted according to a first message associated with a HTTP message format. In some embodiments, server computing device 125 may have similar features to those described for server computing device 125 in FIG. 3 and FIG. 4, including a transaction routing service that may comprise the translation module 310 and the risk analysis module 320.

The first message 640 may be an ISO message (e.g., ISO response message) including a message type indicator 642, bitmaps 644, and data elements 646. The possible values for the message type indicator 642, bitmaps 644, and data elements 646 are described in FIG. 5. In some embodiments of flow 700, the first message 640 may be received from an issuer or ACS and may include information provided by the issuer or ACS within data elements 646 (e.g., authentication result).

At step 601, the server computing device 125 may receive the first message 640 (e.g., step 9A of FIG. 3). Server computing device 125 may then translate the first message 640 formatted according to an ISO message format to a modified message formatted according to a HTTP message format. Some parts of flow 700 may be similar to flow 600 of FIG. 6. For example, the information collection submodule 310A may, in conjunction with data processors 125A, extract information from the first message 640. The format conversion submodule 310B may, in conjunction with data processors 125A, access message format database 530 to determine fields types, attributes, and field lengths of the first message 640 based on the ISO message format, field types attributes and field lengths of the second message 610 to be generated based on the HTTP message format, and correlations between the fields of the ISO message format and the HTTP message format. In some cases, the format conversion submodule 310B may provide instructions to the message generation submodule regarding how to appropriately insert information into the second message 610. The message generation submodule 310C may then initialize the second message 610 and insert information extracted by information collection submodule 310A into the second message 610, based on instructions provided by the format conversion submodule 310B.

The second message 610 may be a HTTP message (e.g., HTTP response message) including a status line 612 comprising a version 612A field, a status code 612B field, and a phrase 612C field, header lines 614, a blank line 616, and an entity body 618. The version 612A field may indicate the HTTP version utilized for the second message 610, the status code 612B field may be a numerical code indicating the result of the request, and the phrase 612C may include the result of the request in words (e.g., "the request succeeded"). The version 612A field, a status code 612B field, and a phrase 612C field may each be separated by a space and the status line 612 may be terminated by a CRLF.

The header lines 614 may include one or more fields including information related to the HTTP transaction and may, in some embodiments, be expressed in name-value pairs. Each header field may be separated by a CRLF and the termination of the header lines 614 may be indicated by an additional CRLF, shown by the blank line 616.

The entity body 618 may include data to be sent with the second message 610. In some embodiments, the entity body 618 may include information included in data elements 646 of the first message 640. For example, the issuer may include in a data field of the data elements 646 in the first message 640 an authentication result, which may be inserted into the entity body 618 of second message 610 by server computing device 125. In some implementations, the entity body 618 may include HTML, JSON, JavaScript, XML, etc.

At step 602, the server computing device 125 may complete generation of the second message 610 formatted according to a HTTP message format (e.g., step 9A of FIG. 3). In some embodiments, the second message 610 may be sent to a computing device of the user conducting the transaction.

IV. Exemplary System/Computer Apparatus

Figure 8:
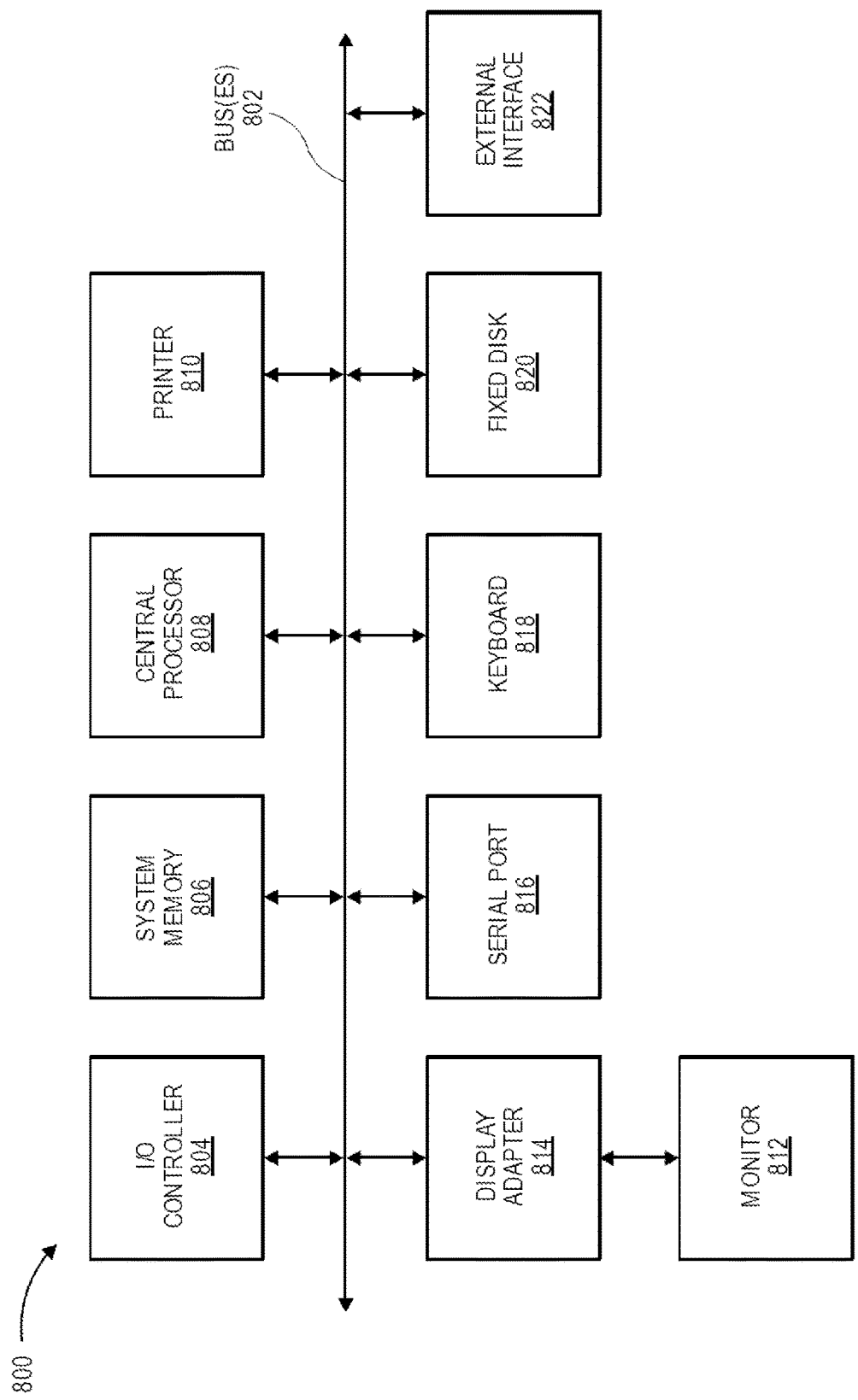
FIG. 8 illustrates a high level block diagram of a computer system that may be used to implement embodiments of the invention.

FIG. 8 illustrates a high level block diagram 800 of a computer system that may be used to implement embodiments of the invention. The subsystems shown in FIG. 8 are interconnected via one or more system buses 802. Additional subsystems include a printer 810, keyboard 818, fixed disk 820, and monitor 812, which is coupled to display adapter 814. Peripherals and input/output (I/O) devices, which couple to I/O controller 804, can be connected to the computer system by any number of means known in the art, such as a serial port 816 or Universal Serial Bus (USB) port. For example, serial port 816 or external interface 822 can be used to connect the computer apparatus to a network (e.g., wide area network, local area network, etc.) such as the Internet, a mouse input device, touchscreen, or a scanner. The interconnection via system bus 802 allows the one or more processors 808 to communicate with each subsystem and to control the execution of instructions from system memory 806 or the fixed disk 820, as well as the exchange of data between subsystems. The system memory 806 and/or the fixed disk 820 may embody a non-transitory computer-readable storage medium. The non-transitory computer-readable storage medium may store instructions that, when executed by the one or more processors 808, cause the computer system to implement the methods and flows described herein.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of data such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired data and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents. It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software. Any of the software components or functions described in this application, may be implemented as software code to be executed by a processor using any suitable computer language such as, for example, Java, C, C++, Python or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

A recitation of "a", "an" or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

What is claimed is:

1. A method, comprising:
   receiving, at a server computing device from a computing device of a user, during a transaction with a merchant server computer, over a communications network, a transaction authentication request message for the transaction in a Hypertext Transfer Protocol (HTTP) message format comprising HTTP fields, the transaction authentication request message including both authentication information and authorization information comprising a device identifier of the computing device of the user, a merchant identifier, a merchant location, a card verification value, and a transaction amount;
   generating, by the server computing device based upon the transaction authentication request message, a risk assessment value for the transaction;
   translating, by the server computing device, the transaction authentication request message to an International Organization for Standardization (ISO) 8583 message format comprising ISO 8583 fields, by
   (i) extracting, using an information collection submodule in the server computing device, the authentication information and the authorization information from the transaction authentication request message in the Hypertext Transfer Protocol (HTTP) message format,
   (ii) accessing, using a format conversion submodule in the server computing device, correlations between the ISO 8583 fields and the HTTP fields from a message format database, and
   (iii) based on the field correlations, generating, using a message generation submodule in the server computing device, a modified transaction authentication request message by inserting the authentication information and the authorization information collected using the information collection submodule, the risk assessment value, and one or more of a geolocation value that identifies a geographic location of the computing device of the user, a feature identifier that identifies characteristics of the computing device of the user, or a network address of the computing device of the user into the ISO 8583 fields to form the modified transaction authentication request message;
   transmitting, by the server computing device to an authorization computer, the modified transaction authentication request message in the ISO 8583 message format;

receiving, by the server computing device from the authorization computer, a challenge request message in the ISO 8583 message format requesting authentication of the user;

generating, by the server computing device, a modified challenge request message according to the HTTP message format;

transmitting, by the server computing device to the computing device of the user, the modified challenge request message in the HTTP message format;

receiving, by the server computing device from the computing device of the user, a challenge response message in the HTTP message format;

generating, by the server computing device, a modified challenge response message in the ISO 8583 message format;

transmitting, by the server computing device, the modified challenge response message in the ISO 8583 message format to the authorization computer;

receiving, by the server computing device from the authorization computer based on the modified transaction authentication request message and the modified challenge response message, an authorization response message in the ISO 8583 message format comprising an authorization result; and transmitting, by the server computing device to the merchant server computer, the authorization response message in the ISO 8583 format.

2. A system comprising a server computing device comprising:

a set of one or more processors;

a set of one or more physical network interfaces coupled with the set of processors; and a non-transitory computer readable storage medium coupled with the set of processors and storing instructions comprising an information collection submodule, a format conversion submodule, and a message generation submodule that, when executed by the set of processors, causes the set of processors to perform a method comprising:

receiving, from a computing device of a user, during a transaction with a merchant server computer, over a communications network, a transaction authentication request message for the transaction in a Hypertext Transfer Protocol (HTTP) message format comprising HTTP fields, the transaction authentication request message including both authentication information and authorization information comprising a device identifier of the computing device of the user, a merchant identifier, a merchant location, a card verification value, and a transaction amount;

generating, based upon the transaction authentication request message, a risk assessment value for the transaction;

translating the transaction authentication request message to an International Organization for Standardization (ISO) 8583 message format comprising ISO 8583 fields, by (i) extracting, using the information collection submodule in the server computing device, the authentication information and the authorization information from the transaction authentication request message in the Hypertext Transfer Protocol (HTTP) message format, (ii) accessing, using the format conversion submodule in the server computing device, correlations between the ISO 8583 fields and the HTTP fields from a message format database, and (iii) based on the field correlations, generating, using the message generation submodule in the server computing device, a modified transaction authentication request message in the ISO 8583 message format by inserting the authentication information and the authorization information collected using the information collection submodule, the risk assessment value, and one or more of a geolocation value that identifies a geographic location of the computing device of the user, a feature identifier that identifies characteristics of the computing device of the user, or a network address of the computing device of the user into the ISO 8583 fields to form the modified transaction authentication request message;

transmitting, to an authorization computer, the modified transaction authentication request message in the ISO 8583 message format;

receiving, from the authorization computer, a challenge request message in the ISO 8583 message format requesting authentication of the user;

generating a modified challenge request message according to the HTTP message format;

transmitting, to the computing device of the user, the modified challenge request message in the HTTP message format;

receiving, from the computing device of the user, a challenge response message in the HTTP message format;

generating a modified challenge response message in the ISO 8583 message format;

transmitting the modified challenge response message in the ISO 8583 message format to the authorization computer;

receiving, from the authorization computer based on the modified transaction authentication request message and the modified challenge response message, an authorization response message in the ISO 8583 message format comprising an authorization result; and transmitting, to the merchant server computer, the authorization response message in the ISO 8583 message format.

3. The method of claim 1, wherein the server computing device receives the transaction authentication request message from the computing device of the user.

4. The system of claim 2, wherein the server computing device receives the transaction authentication request message from the computing device of the user.

5. The method of claim 1, wherein the risk assessment value is generated based on historical information surrounding the user and computing device of the user.

6. The method of claim 1, wherein translating the transaction authentication request message comprises adding data extracted from the HTTP message as one or more subfields of one or more existing ISO-defined data element fields.

7. The system of claim 2, wherein the risk assessment value is generated based on historical information surrounding the user and computing device of the user.

8. The system of claim 2, wherein translating the transaction authentication request message comprises adding data extracted from the HTTP message as one or more subfields of one or more existing ISO-defined data element fields.

* * * * *